(12) United States Patent
Cook et al.

(10) Patent No.: US 9,774,086 B2
(45) Date of Patent: Sep. 26, 2017

(54) WIRELESS POWER APPARATUS AND METHODS

(75) Inventors: Nigel P. Cook, El Cajon, CA (US); Paul Meier, Hamilton (NZ); Lukas Sieber, Olten (CH); Marc Secall, Fribourg (CH); Hanspeter Widmer, Wohlenschwil (CH)

(73) Assignee: QUALCOMM Incorporated, San Diego, CA (US)

( * ) Notice: Subject to any disclaimer, the term of this patent is extended or adjusted under 35 U.S.C. 154(b) by 1165 days.

(21) Appl. No.: 12/018,069

(22) Filed: Jan. 22, 2008

(65) Prior Publication Data
US 2008/0211320 A1 Sep. 4, 2008

Related U.S. Application Data

(60) Provisional application No. 60/904,628, filed on Mar. 2, 2007.

(51) Int. Cl.
*H02J 17/00* (2006.01)
*H01Q 1/50* (2006.01)
*H01Q 9/00* (2006.01)
*H01Q 7/00* (2006.01)

(52) U.S. Cl.
CPC .............. *H01Q 7/005* (2013.01); *H02J 17/00* (2013.01)

(58) Field of Classification Search
USPC ..... 455/41.1, 41.3, 41.4; 343/741, 861, 745, 343/866; 340/10.1, 572.1, 572.2
See application file for complete search history.

(56) References Cited

U.S. PATENT DOCUMENTS

| | | | |
|---|---|---|---|
| 3,098,971 A | 7/1963 | Richardson | |
| 3,480,229 A | 11/1969 | Entremont | |
| 3,588,905 A * | 6/1971 | Dunlavy, Jr. | ................. 343/856 |
| 3,675,108 A | 7/1972 | Nicholl | |
| 3,938,018 A | 2/1976 | Dahl | |
| 3,999,185 A | 12/1976 | Polgar, Jr. et al. | |
| 4,088,999 A | 5/1978 | Fletcher et al. | |
| 4,388,524 A | 6/1983 | Walton | |
| 4,390,924 A | 6/1983 | Nebiker, Jr. | |
| 4,473,825 A | 9/1984 | Walton | |
| 4,524,411 A | 6/1985 | Willis | |
| 4,760,394 A | 7/1988 | Takeuchi et al. | |
| 4,914,539 A | 4/1990 | Turner et al. | |
| 4,959,568 A | 9/1990 | Stokes | |
| 4,959,764 A | 9/1990 | Bassett | |

(Continued)

FOREIGN PATENT DOCUMENTS

| | | |
|---|---|---|
| CN | 1202025 A | 12/1998 |
| CN | 1231069 A | 10/1999 |

(Continued)

OTHER PUBLICATIONS

Dong-Gi Youn et al, "A Study on the Fundamental Transmission Experiment for Wireless Power Transmission System," 1999 IEEE Conference, TENCON 99, vol. 2, pp. 1419-1422, Sep. 1999.

(Continued)

*Primary Examiner* — Nay A Maung
*Assistant Examiner* — Erica Fleming-Hall

(57) ABSTRACT

Wireless energy transfer system. Antennas are maintained at resonance with High Q. Techniques of maintaining the high-Q resonance matching are disclosed.

49 Claims, 5 Drawing Sheets

(56) References Cited

U.S. PATENT DOCUMENTS

| | | | |
|---|---|---|---|
| 5,027,709 A | 7/1991 | Slagle | |
| 5,072,233 A | 12/1991 | Zanzig | |
| 5,153,583 A | 10/1992 | Murdoch | |
| 5,175,561 A | 12/1992 | Goto | |
| 5,225,847 A | 7/1993 | Roberts et al. | |
| 5,287,262 A | 2/1994 | Klein | |
| 5,387,818 A | 2/1995 | Leibowitz | |
| 5,396,538 A | 3/1995 | Hong | |
| 5,397,962 A | 3/1995 | Moslehi | |
| 5,400,036 A | 3/1995 | Kochiyama et al. | |
| 5,400,037 A | 3/1995 | East | |
| 5,438,699 A * | 8/1995 | Coveley | 455/67.14 |
| 5,450,305 A | 9/1995 | Boys et al. | |
| 5,455,466 A | 10/1995 | Parks et al. | |
| 5,491,715 A | 2/1996 | Flaxl | |
| 5,519,262 A | 5/1996 | Wood | |
| 5,574,441 A | 11/1996 | Roes et al. | |
| 5,596,567 A | 1/1997 | DeMuro et al. | |
| 5,608,417 A | 3/1997 | De Vall | |
| 5,621,322 A | 4/1997 | Ehnholm | |
| 5,621,913 A | 4/1997 | Tuttle et al. | |
| 5,654,621 A | 8/1997 | Seelig | |
| 5,684,828 A | 11/1997 | Bolan et al. | |
| 5,701,121 A | 12/1997 | Murdoch | |
| 5,734,255 A | 3/1998 | Thompson et al. | |
| 5,754,948 A | 5/1998 | Metze | |
| 5,767,601 A | 6/1998 | Uchiyama | |
| 5,796,240 A | 8/1998 | Saito et al. | |
| 5,812,065 A * | 9/1998 | Schrott et al. | 340/10.34 |
| 5,821,638 A | 10/1998 | Boys et al. | |
| 5,826,178 A | 10/1998 | Owen | |
| 5,856,710 A | 1/1999 | Baughman et al. | |
| 5,936,575 A | 8/1999 | Azzarelli et al. | |
| 5,963,012 A | 10/1999 | Garcia et al. | |
| 5,966,941 A | 10/1999 | Ghoshal | |
| 5,975,714 A | 11/1999 | Vetorino et al. | |
| 5,982,139 A | 11/1999 | Parise | |
| 6,016,046 A | 1/2000 | Kaite et al. | |
| 6,028,413 A | 2/2000 | Brockmann | |
| 6,031,708 A | 2/2000 | Guermeur | |
| 6,040,680 A | 3/2000 | Toya et al. | |
| 6,040,986 A | 3/2000 | Sakamoto et al. | |
| 6,104,354 A | 8/2000 | Hill et al. | |
| 6,114,834 A | 9/2000 | Parise | |
| 6,118,249 A * | 9/2000 | Brockmann et al. | 320/108 |
| 6,127,799 A | 10/2000 | Krishnan | |
| 6,175,124 B1 | 1/2001 | Cole et al. | |
| 6,184,651 B1 | 2/2001 | Fernandez et al. | |
| 6,265,789 B1 | 7/2001 | Honda et al. | |
| 6,275,681 B1 | 8/2001 | Vega et al. | |
| 6,291,901 B1 | 9/2001 | Cefo | |
| 6,317,338 B1 | 11/2001 | Boys | |
| 6,321,067 B1 | 11/2001 | Suga et al. | |
| 6,337,628 B2 | 1/2002 | Campana, Jr. | |
| 6,341,076 B1 | 1/2002 | Kadatskyy et al. | |
| 6,411,824 B1 | 6/2002 | Eidson | |
| 6,437,685 B2 | 8/2002 | Hanaki | |
| 6,501,364 B1 | 12/2002 | Hui et al. | |
| 6,507,152 B2 | 1/2003 | Matsumoto et al. | |
| 6,515,878 B1 * | 2/2003 | Meins | B60L 5/005 191/10 |
| 6,523,493 B1 | 2/2003 | Brcka | |
| 6,556,054 B1 | 4/2003 | Goodman et al. | |
| 6,633,026 B2 | 10/2003 | Tuominen | |
| 6,636,146 B1 | 10/2003 | Wehoski | |
| 6,670,864 B2 | 12/2003 | Hyvonen et al. | |
| 6,798,716 B1 | 9/2004 | Charych | |
| 6,803,744 B1 | 10/2004 | Sabo | |
| 6,879,076 B2 | 4/2005 | Long | |
| 6,882,128 B1 | 4/2005 | Rahmel et al. | |
| 6,891,287 B2 | 5/2005 | Moret | |
| 6,912,137 B2 | 6/2005 | Berghegger | |
| 6,960,968 B2 | 11/2005 | Odendaal et al. | |
| 6,965,352 B2 | 11/2005 | Ohara et al. | |
| 6,967,462 B1 | 11/2005 | Landis | |
| 6,972,542 B2 | 12/2005 | Patino et al. | |
| 6,972,543 B1 | 12/2005 | Wells | |
| 7,012,405 B2 | 3/2006 | Nishida et al. | |
| 7,068,991 B2 | 6/2006 | Parise | |
| 7,076,206 B2 | 7/2006 | Elferich et al. | |
| 7,095,301 B2 | 8/2006 | Hidaka et al. | |
| 7,110,462 B2 | 9/2006 | Monsen | |
| 7,116,018 B2 | 10/2006 | Strobl | |
| 7,154,451 B1 | 12/2006 | Sievenpiper | |
| 7,164,344 B2 | 1/2007 | Deguchi et al. | |
| 7,167,139 B2 | 1/2007 | Kim et al. | |
| 7,180,265 B2 | 2/2007 | Naskali et al. | |
| 7,180,291 B2 * | 2/2007 | Chmielewski et al. | 324/318 |
| 7,209,792 B1 * | 4/2007 | Parramon et al. | 607/120 |
| 7,212,414 B2 | 5/2007 | Baarman | |
| 7,215,061 B2 | 5/2007 | Kihara et al. | |
| 7,248,165 B2 | 7/2007 | Collins et al. | |
| 7,256,532 B2 | 8/2007 | Viehland et al. | |
| 7,257,093 B1 | 8/2007 | Witzke et al. | |
| 7,262,701 B1 | 8/2007 | Nguyen | |
| 7,380,150 B2 | 5/2008 | Meier et al. | |
| 7,423,518 B2 | 9/2008 | Yamada | |
| 7,511,500 B2 | 3/2009 | Schiano et al. | |
| 7,522,846 B1 * | 4/2009 | Lewis et al. | 398/197 |
| 7,525,283 B2 | 4/2009 | Cheng et al. | |
| 7,554,316 B2 | 6/2009 | Stevens et al. | |
| 7,598,646 B2 | 10/2009 | Cleveland | |
| 7,603,077 B2 | 10/2009 | Onomatsu et al. | |
| 7,675,197 B2 | 3/2010 | Tetlow | |
| 7,676,263 B2 | 3/2010 | Harris et al. | |
| 7,688,036 B2 | 3/2010 | Yarger et al. | |
| 7,755,552 B2 | 7/2010 | Schantz et al. | |
| 7,760,151 B2 | 7/2010 | Poilasne et al. | |
| 7,777,396 B2 | 8/2010 | Rastegar et al. | |
| 7,825,543 B2 | 11/2010 | Karalis et al. | |
| 7,839,124 B2 | 11/2010 | Yamazaki et al. | |
| 7,844,306 B2 | 11/2010 | Shearer et al. | |
| 7,868,482 B2 | 1/2011 | Greene et al. | |
| 7,885,050 B2 | 2/2011 | Lee | |
| 8,055,310 B2 | 11/2011 | Beart et al. | |
| 8,159,412 B2 | 4/2012 | Yun et al. | |
| 8,169,185 B2 | 5/2012 | Partovi et al. | |
| 8,253,278 B2 | 8/2012 | Cook et al. | |
| 8,373,514 B2 | 2/2013 | Cook et al. | |
| 8,378,522 B2 | 2/2013 | Cook et al. | |
| 8,378,523 B2 | 2/2013 | Cook et al. | |
| 2001/0012208 A1 | 8/2001 | Boys | |
| 2001/0026423 A1 | 10/2001 | Ieda et al. | |
| 2001/0029167 A1 | 10/2001 | Takeda et al. | |
| 2002/0017979 A1 | 2/2002 | Krause et al. | |
| 2002/0029797 A1 | 3/2002 | Mikami et al. | |
| 2002/0036977 A1 | 3/2002 | Lenssen et al. | |
| 2002/0057161 A1 | 5/2002 | Katsura et al. | |
| 2002/0057584 A1 | 5/2002 | Brockmann | |
| 2002/0077138 A1 * | 6/2002 | Bark et al. | 455/522 |
| 2002/0123779 A1 * | 9/2002 | Zarinetchi et al. | 607/60 |
| 2002/0150065 A1 * | 10/2002 | Ponnekanti | 370/334 |
| 2002/0160722 A1 * | 10/2002 | Terranova et al. | 455/73 |
| 2002/0180584 A1 | 12/2002 | McGregor et al. | |
| 2002/0190908 A1 | 12/2002 | Andrews et al. | |
| 2003/0090353 A1 | 5/2003 | Robinson et al. | |
| 2003/0144031 A1 * | 7/2003 | Ono et al. | 455/558 |
| 2003/0162566 A1 | 8/2003 | Shapira et al. | |
| 2003/0174099 A1 | 9/2003 | Bauer et al. | |
| 2003/0193438 A1 | 10/2003 | Yoon | |
| 2003/0199778 A1 | 10/2003 | Mickle et al. | |
| 2003/0203733 A1 | 10/2003 | Sharon | |
| 2003/0214961 A1 | 11/2003 | Nevo et al. | |
| 2004/0001029 A1 * | 1/2004 | Parsche et al. | 343/866 |
| 2004/0002835 A1 | 1/2004 | Nelson | |
| 2004/0130425 A1 | 7/2004 | Dayan et al. | |
| 2004/0150521 A1 | 8/2004 | Stilp | |
| 2004/0160323 A1 | 8/2004 | Stilp | |
| 2004/0178680 A1 * | 9/2004 | Fishman | H02M 5/458 307/17 |
| 2004/0183622 A1 | 9/2004 | Gevorgian et al. | |
| 2004/0212500 A1 | 10/2004 | Stilp | |
| 2004/0227002 A1 | 11/2004 | Watanabe | |
| 2004/0227057 A1 | 11/2004 | Tuominen et al. | |

(56) References Cited

U.S. PATENT DOCUMENTS

| | | | |
|---|---|---|---|
| 2004/0227619 A1 | 11/2004 | Watanabe | |
| 2005/0007239 A1 | 1/2005 | Woodard et al. | |
| 2005/0017677 A1 | 1/2005 | Burton et al. | |
| 2005/0029351 A1 | 2/2005 | Yoshinaga et al. | |
| 2005/0043055 A1 | 2/2005 | Vance | |
| 2005/0057422 A1 | 3/2005 | Deguchi et al. | |
| 2005/0075697 A1* | 4/2005 | Olson et al. | 607/61 |
| 2005/0104457 A1* | 5/2005 | Jordan et al. | 310/36 |
| 2005/0119716 A1 | 6/2005 | McClure et al. | |
| 2005/0125093 A1* | 6/2005 | Kikuchi et al. | 700/213 |
| 2005/0127867 A1 | 6/2005 | Calhoon et al. | 320/108 |
| 2005/0131495 A1 | 6/2005 | Parramon et al. | 607/61 |
| 2005/0194926 A1 | 9/2005 | Di Stefano | |
| 2005/0264452 A1 | 12/2005 | Fujishima et al. | |
| 2005/0273143 A1* | 12/2005 | Kanzius | A61K 41/0052 607/101 |
| 2006/0017438 A1 | 1/2006 | Mullen et al. | |
| 2006/0032926 A1 | 2/2006 | Baba et al. | |
| 2006/0061325 A1 | 3/2006 | Tang et al. | |
| 2006/0071790 A1 | 4/2006 | Duron et al. | |
| 2006/0094449 A1 | 5/2006 | Goldberg | |
| 2006/0103355 A1 | 5/2006 | Patino et al. | |
| 2006/0103506 A1* | 5/2006 | Rodgers et al. | 340/10.5 |
| 2006/0113955 A1 | 6/2006 | Nunally | |
| 2006/0121639 A1 | 6/2006 | Tai et al. | |
| 2006/0125703 A1 | 6/2006 | Ma et al. | |
| 2006/0145659 A1 | 7/2006 | Patino et al. | |
| 2006/0145660 A1 | 7/2006 | Black et al. | |
| 2006/0159536 A1 | 7/2006 | Pu | |
| 2006/0160517 A1 | 7/2006 | Yoon | |
| 2006/0164312 A1 | 7/2006 | Mathieu | |
| 2006/0176676 A1 | 8/2006 | Kuroda et al. | |
| 2006/0208903 A1 | 9/2006 | Loh et al. | |
| 2006/0239043 A1 | 10/2006 | Ohbo | |
| 2006/0273756 A1 | 12/2006 | Bowling et al. | |
| 2007/0010295 A1 | 1/2007 | Greene et al. | |
| 2007/0029965 A1 | 2/2007 | Hui et al. | |
| 2007/0046433 A1 | 3/2007 | Mukherjee | |
| 2007/0054705 A1 | 3/2007 | Liow et al. | |
| 2007/0060221 A1 | 3/2007 | Burgan et al. | |
| 2007/0082611 A1* | 4/2007 | Terranova et al. | 455/41.1 |
| 2007/0087719 A1* | 4/2007 | Mandal et al. | 455/299 |
| 2007/0091006 A1* | 4/2007 | Thober et al. | 343/745 |
| 2007/0096910 A1 | 5/2007 | Waters | |
| 2007/0103110 A1 | 5/2007 | Sagoo et al. | |
| 2007/0103291 A1 | 5/2007 | Adams | |
| 2007/0105524 A1 | 5/2007 | Fullam et al. | |
| 2007/0114945 A1 | 5/2007 | Mattaboni et al. | |
| 2007/0120678 A1 | 5/2007 | Posamentier | |
| 2007/0126395 A1 | 6/2007 | Suchar | |
| 2007/0126650 A1 | 6/2007 | Guenther | |
| 2007/0135078 A1 | 6/2007 | Ljung | |
| 2007/0139000 A1 | 6/2007 | Kozuma et al. | |
| 2007/0145830 A1 | 6/2007 | Lee et al. | |
| 2007/0146218 A1* | 6/2007 | Turner et al. | 343/718 |
| 2007/0156204 A1* | 7/2007 | Denker et al. | 607/61 |
| 2007/0164414 A1* | 7/2007 | Dokai et al. | 257/679 |
| 2007/0171681 A1 | 7/2007 | Baarman | |
| 2007/0178945 A1 | 8/2007 | Cook et al. | |
| 2007/0188326 A1 | 8/2007 | Pluss et al. | |
| 2007/0188375 A1* | 8/2007 | Richards | G01S 11/06 342/125 |
| 2007/0205881 A1 | 9/2007 | Breed | |
| 2007/0214940 A1* | 9/2007 | Stoneback | 84/600 |
| 2007/0222542 A1 | 9/2007 | Joannopoulos | |
| 2007/0229281 A1 | 10/2007 | Shionoiri et al. | |
| 2007/0281625 A1 | 12/2007 | Boys | |
| 2007/0285819 A1 | 12/2007 | Gerhardinger | |
| 2007/0296393 A1 | 12/2007 | Malpas et al. | |
| 2007/0296548 A1 | 12/2007 | Hall et al. | |
| 2007/0298846 A1 | 12/2007 | Greene et al. | |
| 2008/0003963 A1 | 1/2008 | Turner | |
| 2008/0014897 A1 | 1/2008 | Cook et al. | |
| 2008/0054638 A1 | 3/2008 | Greene et al. | |
| 2008/0067874 A1 | 3/2008 | Tseng | |
| 2008/0093454 A1 | 4/2008 | Yamazaki et al. | |
| 2008/0093934 A1 | 4/2008 | Kato | |
| 2008/0108862 A1* | 5/2008 | Jordan et al. | 600/30 |
| 2008/0122294 A1 | 5/2008 | Simon et al. | |
| 2008/0122297 A1 | 5/2008 | Arai | |
| 2008/0129147 A1 | 6/2008 | Thiesen et al. | |
| 2008/0152183 A1 | 6/2008 | Janik et al. | |
| 2008/0167755 A1 | 7/2008 | Curt | |
| 2008/0186129 A1 | 8/2008 | Fitzgibbon | |
| 2008/0191897 A1 | 8/2008 | McCollough | 340/625.22 |
| 2008/0211455 A1 | 9/2008 | Park et al. | |
| 2008/0211630 A1* | 9/2008 | Butler et al. | 340/10.1 |
| 2008/0225564 A1 | 9/2008 | Bohm et al. | |
| 2008/0293446 A1 | 11/2008 | Rofougaran et al. | |
| 2008/0296978 A1 | 12/2008 | Finkenzeller et al. | |
| 2008/0309452 A1 | 12/2008 | Zeine | |
| 2008/0317274 A1 | 12/2008 | Kim | |
| 2009/0002175 A1 | 1/2009 | Waters | |
| 2009/0009177 A1 | 1/2009 | Kim et al. | |
| 2009/0026907 A1 | 1/2009 | Davidowitz et al. | |
| 2009/0045772 A1 | 2/2009 | Cook et al. | |
| 2009/0051224 A1 | 2/2009 | Cook et al. | |
| 2009/0052721 A1 | 2/2009 | Dabrowski | |
| 2009/0058361 A1 | 3/2009 | John | |
| 2009/0072627 A1 | 3/2009 | Cook et al. | |
| 2009/0079268 A1 | 3/2009 | Cook et al. | |
| 2009/0102296 A1 | 4/2009 | Greene et al. | |
| 2009/0102419 A1 | 4/2009 | Gwon et al. | |
| 2009/0109102 A1* | 4/2009 | Dokai et al. | 343/702 |
| 2009/0111531 A1 | 4/2009 | Cui et al. | |
| 2009/0121713 A1 | 5/2009 | Van Helvoort | |
| 2009/0146892 A1 | 6/2009 | Shimizu et al. | |
| 2009/0167449 A1 | 7/2009 | Cook et al. | |
| 2009/0171178 A1* | 7/2009 | He | A61B 5/0031 600/365 |
| 2009/0204170 A1 | 8/2009 | Hastings et al. | |
| 2009/0218884 A1 | 9/2009 | Soar | |
| 2009/0243394 A1 | 10/2009 | Levine | |
| 2009/0273242 A1 | 11/2009 | Cook | |
| 2009/0299918 A1 | 12/2009 | Cook et al. | |
| 2009/0308933 A1 | 12/2009 | Osada | |
| 2010/0013434 A1 | 1/2010 | Taylor-Haw et al. | |
| 2010/0068998 A1 | 3/2010 | Zyambo et al. | |
| 2010/0109445 A1 | 5/2010 | Kurs et al. | |
| 2010/0134366 A1 | 6/2010 | Yu | |
| 2010/0176936 A1 | 7/2010 | Garber et al. | |
| 2010/0277387 A1 | 11/2010 | Schantz et al. | |
| 2010/0289331 A1 | 11/2010 | Shionoiri et al. | |
| 2010/0289449 A1 | 11/2010 | Elo | |
| 2010/0315045 A1 | 12/2010 | Zeine | |
| 2011/0031821 A1 | 2/2011 | Greene et al. | |
| 2011/0050166 A1 | 3/2011 | Cook et al. | |
| 2011/0069516 A1 | 3/2011 | Greene et al. | |
| 2011/0074349 A1 | 3/2011 | Ghovanloo | |
| 2012/0299540 A1* | 11/2012 | Perry | 320/108 |

FOREIGN PATENT DOCUMENTS

| | | |
|---|---|---|
| CN | 1237009 A | 12/1999 |
| CN | 2582188 Y | 10/2003 |
| CN | 1497768 A | 5/2004 |
| CN | 1545747 A | 11/2004 |
| CN | 1677791 A | 10/2005 |
| CN | 1689190 A | 10/2005 |
| CN | 1768467 A | 5/2006 |
| DE | 4023412 | 2/1992 |
| DE | 19509918 | 9/1996 |
| DE | 19729722 | 1/1999 |
| DE | 19938460 | 2/2001 |
| DE | 102004009896 | 9/2005 |
| DE | 102005053111 | 5/2007 |
| EP | 0568920 | 11/1993 |
| EP | 298707 | 9/1994 |
| EP | 724308 | 7/1996 |
| EP | 773509 | 4/2002 |
| EP | 1233547 A1 | 8/2002 |
| EP | 1302822 | 4/2003 |
| EP | 1315051 | 5/2003 |
| EP | 1003266 | 4/2006 |

(56) References Cited

FOREIGN PATENT DOCUMENTS

| | | |
|---|---|---|
| EP | 1413975 | 5/2007 |
| EP | 1892799 | 2/2008 |
| GB | 1280516 | 7/1972 |
| GB | 1343071 | 1/1974 |
| GB | 2070298 | 9/1981 |
| GB | 2318696 | 4/1998 |
| JP | S55111632 A | 8/1980 |
| JP | S55133106 A | 10/1980 |
| JP | 57032144 | 2/1982 |
| JP | S58170330 A | 10/1983 |
| JP | 62071430 A | 4/1987 |
| JP | S6312824 U | 1/1988 |
| JP | 1298901 A | 12/1989 |
| JP | H037034 A | 1/1991 |
| JP | H0317483 A | 1/1991 |
| JP | H0449483 A | 2/1992 |
| JP | 4115606 A | 4/1992 |
| JP | H04112635 A | 4/1992 |
| JP | 04271201 | 9/1992 |
| JP | 5038232 A | 2/1993 |
| JP | H0541335 A | 2/1993 |
| JP | H05300663 A | 11/1993 |
| JP | 6044207 A | 2/1994 |
| JP | 06133476 | 5/1994 |
| JP | 6044207 U | 6/1994 |
| JP | 6303726 | 10/1994 |
| JP | 6327172 A | 11/1994 |
| JP | 6339232 | 12/1994 |
| JP | H07147212 A | 6/1995 |
| JP | 8033244 A | 2/1996 |
| JP | 8079976 | 3/1996 |
| JP | 8088942 | 4/1996 |
| JP | H08103039 A | 4/1996 |
| JP | 8130840 A | 5/1996 |
| JP | 8162689 A | 6/1996 |
| JP | 9037475 | 2/1997 |
| JP | H0962816 A | 3/1997 |
| JP | 9182322 | 7/1997 |
| JP | H1069533 A | 3/1998 |
| JP | 10097931 | 4/1998 |
| JP | 10145987 A | 5/1998 |
| JP | 10225020 | 8/1998 |
| JP | H1132471 A | 2/1999 |
| JP | H1155878 A | 2/1999 |
| JP | H1197262 A | 4/1999 |
| JP | 11143600 | 5/1999 |
| JP | 11188113 A | 7/1999 |
| JP | 11191146 | 7/1999 |
| JP | H11188113 A | 7/1999 |
| JP | H11196541 A | 7/1999 |
| JP | 11215802 A | 8/1999 |
| JP | H11220813 A | 8/1999 |
| JP | 11332135 | 11/1999 |
| JP | H11308033 A | 11/1999 |
| JP | H11345292 A | 12/1999 |
| JP | 2000078763 | 3/2000 |
| JP | 2000133542 A | 5/2000 |
| JP | 2000173825 A | 6/2000 |
| JP | 2000175379 | 6/2000 |
| JP | 2000184606 A | 6/2000 |
| JP | 2000217279 | 8/2000 |
| JP | 2000285214 A | 10/2000 |
| JP | 2001024548 A | 1/2001 |
| JP | 2001177916 A | 6/2001 |
| JP | 2001186676 A | 7/2001 |
| JP | 2001197672 | 7/2001 |
| JP | 2001238372 A | 8/2001 |
| JP | 2001264432 A | 9/2001 |
| JP | 2001326526 A | 11/2001 |
| JP | 2001526374 A | 12/2001 |
| JP | 2002017058 A | 1/2002 |
| JP | 2002078247 A | 3/2002 |
| JP | 2002508916 A | 3/2002 |
| JP | 2002152191 A | 5/2002 |
| JP | 2002163634 A | 6/2002 |
| JP | 2002198868 A | 7/2002 |
| JP | 2002290131 A | 10/2002 |
| JP | 2002315209 A | 10/2002 |
| JP | 2002320347 | 10/2002 |
| JP | 2003047177 A | 2/2003 |
| JP | 2003047178 A | 2/2003 |
| JP | 2003069335 A | 3/2003 |
| JP | 2003111312 A | 4/2003 |
| JP | 2003158651 A | 5/2003 |
| JP | 2003189507 A | 7/2003 |
| JP | 2003218624 A | 7/2003 |
| JP | 3465078 B2 | 11/2003 |
| JP | 2004096262 A | 3/2004 |
| JP | 2004187429 A | 7/2004 |
| JP | 2005020231 A | 1/2005 |
| JP | 2005039756 A | 2/2005 |
| JP | 2005045298 A | 2/2005 |
| JP | 2005137040 | 5/2005 |
| JP | 3692541 B2 | 9/2005 |
| JP | 2005250545 A | 9/2005 |
| JP | 2005261187 A | 9/2005 |
| JP | 2006042519 | 2/2006 |
| JP | 2006048580 A | 2/2006 |
| JP | 2006053833 A | 2/2006 |
| JP | 2006510101 A | 3/2006 |
| JP | 2006115592 A | 4/2006 |
| JP | 2006149163 A | 6/2006 |
| JP | 2006518179 A | 8/2006 |
| JP | 2006254679 A | 9/2006 |
| JP | 2006296123 A | 10/2006 |
| JP | 2006296144 A | 10/2006 |
| JP | 2006523363 A | 10/2006 |
| JP | 2006317787 A | 11/2006 |
| JP | 2006323683 A | 11/2006 |
| JP | 2007060829 A | 3/2007 |
| JP | 2007110842 A | 4/2007 |
| JP | 2007129658 A | 5/2007 |
| JP | 2007200370 A | 8/2007 |
| JP | 2007280372 A | 10/2007 |
| JP | 2008508842 A | 3/2008 |
| JP | 2009501510 A | 1/2009 |
| JP | 2010539821 A | 12/2010 |
| KR | 102000017058 | 3/2000 |
| KR | 1020010030472 | 4/2001 |
| KR | 20020064451 A | 8/2002 |
| KR | 20050016879 A | 2/2005 |
| KR | 20060070795 A | 6/2006 |
| KR | 20070017804 A | 2/2007 |
| KR | 100691255 B1 | 3/2007 |
| KR | 20070048071 A | 5/2007 |
| KR | 20100083846 A | 7/2010 |
| WO | WO8807732 | 10/1988 |
| WO | 9323908 A1 | 11/1993 |
| WO | WO9619028 | 6/1996 |
| WO | 9850993 A1 | 11/1998 |
| WO | WO9857413 A1 | 12/1998 |
| WO | WO9930090 A1 | 6/1999 |
| WO | WO9950780 | 10/1999 |
| WO | WO9950806 | 10/1999 |
| WO | WO0167413 | 9/2001 |
| WO | WO0260215 | 8/2002 |
| WO | WO03077364 A2 | 9/2003 |
| WO | WO2004038887 | 5/2004 |
| WO | WO2004052563 | 6/2004 |
| WO | WO-2004073150 A1 | 8/2004 |
| WO | WO2004077550 | 9/2004 |
| WO | WO2005086279 | 9/2005 |
| WO | WO2006006636 A1 | 1/2006 |
| WO | WO2006011769 A1 | 2/2006 |
| WO | WO2007008646 A2 | 1/2007 |
| WO | WO2007048052 | 4/2007 |
| WO | 2007083574 A1 | 7/2007 |
| WO | WO2007077442 | 7/2007 |

OTHER PUBLICATIONS

Finkenzeller, "RFID Handbook: Fundamentals and Applications in Contactless Smart Cards and Identification," Second Edition, Trans-

(56) References Cited

OTHER PUBLICATIONS lated by Rachel Waddington, 2003, John Wiley & Sons Ltd., pp. 106-111.

McSpadden et al., "A High Conversion Efficiency 5.8 GHz Rectenna," 1997 IEEE Microwave Symposium, vol. 2, pp. 547-550, Jun. 1997.

McSpadden et al., "Theoretical and Experimental Investigation of a Rectenna Element for Microwave Power Transmission," 1992 IEEE Transactions on Microwave Theory and Techniques, vol. 40, pp. 2359-2366, Dec. 1992.

Kim et al., Switchable polymer-based thin film coils as a power module wireless neural interfaces, Sensors and Actuators, vol. A 136, Issue 1, May 2007 (available online Nov. 27, 2006), pp. 467-474.

Myers et al., "A transcutaneous power transformer," Trans. Amer. Soc. Artif. Inter. Organs, vol. 14, 1968, pp. 210-219.

Shinohara et al., "Experimental Study of Large Rectenna Array for Microwave Energy Transmission," 1998 IEEE Transactions on Microwave Theory and Techniques, vol. 46, pp. 261-268, Mar. 1998.

Onizuka, et al., A design methodology of chip-to-chip wireless power transmission system, Univ. of Tokyo, International Conference on Integrated Circuit Design and Technology, 2007 (ICICDT '07), IEEE, May-Jun. 2007, pp. 1-4.

Schuder et al., "High Level electromagnetic energy transfer through a closed wall", Inst.Radio Engrs. Int.Conf Record 9, pp. 119-126, 1961.

Schuder J.C., "Powering an artificial heart: Birth of the inductively coupled-radio frequency system in 1960", Artificial organs, vol. 26, No. 11, 2002, pp. 909-915.

Tae-Whan Yoo et al., "Theoretical and Experimental Development of 10 and 35 GHz Rectennas," 1992 IEEE Transactions on Microwave Theory and Techniques, vol. 40, pp. 1259-1266, Jun. 1992.

Sekitani et al., "A Large-area Wireless Power-Transmission Sheet Using Printed Organic Transistors and Plastic MEMS Switches," Nature Materials Letter, pp. 413-417; Jan. 2007.

Kurs et al., "Wireless Power Transfer via Strongly Coupled Magnetic Resonances", scimag.org, Jul. 6, 2007, Science, 317: 83-86.

Chunbo et al.,"Research on the topology of wireless energy transfer device", Sch. of Electr. Eng. & Autom., Harbin Inst. of Technol., Harbin This paper appears in: Vehicle Power and Propulsion Conference, 2008. VPPC '08. IEEE Issue Date : Sep. 3-5, 2008 On p. 1 Print ISBN: 978--14244-1848-0 INSPEC Accession Number: 10394615 Digital Object Identifier : 10.1109/VPPC.2008.4677798 Date of Current Version : Nov. 18, 2008.

Karalis et al., "Efficient wireless no-rediative mid-range energy transfer", Science Direct, Annals of Physics, 323(1),34-48.(Jan. 2008). doi:10.1016/j.aop.2007.04.017.

Kim et al., "Electrically Small Magnetic Dipole Antennas With Quality Factors Approaching the Chu Lower Bound", Antennas and Propagation, IEEE Transactions on vol. 58 Issue: 6 Publication Date: Jun. 2010 pp. 1898-1906 Digital Object Identifier: 10.1109/TAP.2010.2046864.

Miranda et al.,"Wireless power transfer using weakly coupled magnetostatic resonators", Energy Conversion Congress and Exposition (ECCE), 2010 IEEE Digital Object Identifier: 10.1109/ECCE.2010.5617728 Publication Year: 2010 , pp. 4179-4186 IEEE Conferences.

Yates et al., "Optimal transmission frequency for ultralow-power short-range radio links", Source: IEEE Transactions on Circuits and Systems I: Fundamental Theory and Applications, v 51, No. 7, 1405-13, Jul. 2004; ISSN: 1057-7122; DOI: 10.1109/TCSI.2004.830696; Publisher: IEEE, USA Author affiliation: Dept. of Electr. & Electron. Eng., Imperial Coll. London, UK.

Harrist, Wireless battery charging system using radio frequency energy harvesting, Master of Science Thesis, University of Pittsburgh, 2004.

International Search Report and Written Opinion—PCT/US08/055600—International Search Authority, European Patent Office—dated Aug. 13, 2008.

Ozawa, R., et al., "Wireless Energy Transmission for Micro Aerial Vehicles Using a Microwave Phased Array," 3rd International Energy Conversion Engineering Conference, Aug. 15-18, 2005, San Francisco, CA, pp. 1-6.

Bayrashev, Andrey, et al., "Low frequency wireless powering of microsystems using piezoelectric-magnetostrictive laminate composites," Sensors & Actuators A: Physical, Sep. 2004, vol. 114, Issue 2/3, pp. 244-249.

Dudek, et al., "High permeability micro-magneto-mechanical systems," International Journal of Applied Electromagnetics and Mechanics (2007), vol. 25, pp. 103-108.

Supplementary European search report—EP08731198—Search Authority—Munich—dated Dec. 10, 2012.

Onizuka K., et al., "Chip-to-Chip Inductive Wireless Power Transmission System for SiP Applications," Conference 2006, IEEE Custom Integrated Circuits, IEEE, Piscataway, NJ, USA, Sep. 1, 2006 (Sep. 1, 2006), pp. 575-578, XP031052537.

Lo E., et al., "Wireless Battery Charger" (RF/Microwave to DC Conversion), EE 198B Final Report, Dec. 2, 2005, pp. 1-20. http://www.engr.sjsu.edu/rkwok/projects/EE198B%20-%20Wireless%20Battery%20Charger.pdf.

ATIS Telecom Glossary, available at http://www.atis.org/glossary/definition.aspx?id=5951, retrieved on Mar. 23, 2015, 1 Page.

IEEE 100 The Authoritative Dictionary of IEEE Standards Terms, Seventh Edition, the Institute of Electrical and Electronics Engineers, Inc. Published Dec. 2000, p. 121.

"Wireless Non-Radiative Energy Transfer", MIT paper, publication and date unknown, believed to be 2007.

"Efficient wireless non-radiative mid-range energy transfer", MITpaper, publication and date unknown, believed to be 2007.

"Wireless Power Transfer via Strongly Coupled Magnetic Resonances", Kurs et al, Science Express, Jun. 7, 2007.

"Wireless Power Transfer via Strongly Coupled Magnetic Resonances", Kurs et al, scimag.org, Jul. 6, 2007.

* cited by examiner

WIRELESS POWER APPARATUS AND METHODS

RELATED APPLICATIONS

This application is related to co-owned and co-pending U.S. patent application Ser. No. 11/408,793 Filed Apr. 21, 2006 and entitled "Method and System for Powering an Electronic Device Via a Wireless Link", and U.S. patent application Ser. No. 11/654,883 filed Jan. 17, 2007 entitled "Method and Apparatus for Delivering Energy to an Electrical or Electronic Device Via a Wireless Link", each of the foregoing incorporated herein by reference in its entirety.

This application claims priority from provisional application No. 60/904,628, filed Mar. 2, 2007; the disclosure of which is herewith incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

All figures, tables, and Exhibits are Copyright © 2006, 2007 Third Option, LLC. All rights reserved.

BACKGROUND

Delivery of power to portable devices often uses wires of various types to carry out the power delivery. Devices such as cell phones, portable computers, or any other device that can operate from stored power such as a battery, all require and use such a source of power to operate the device and/or charge the battery.

SUMMARY

Techniques of wireless power transfer are disclosed herein.

DETAILED DESCRIPTION

Figure 1:
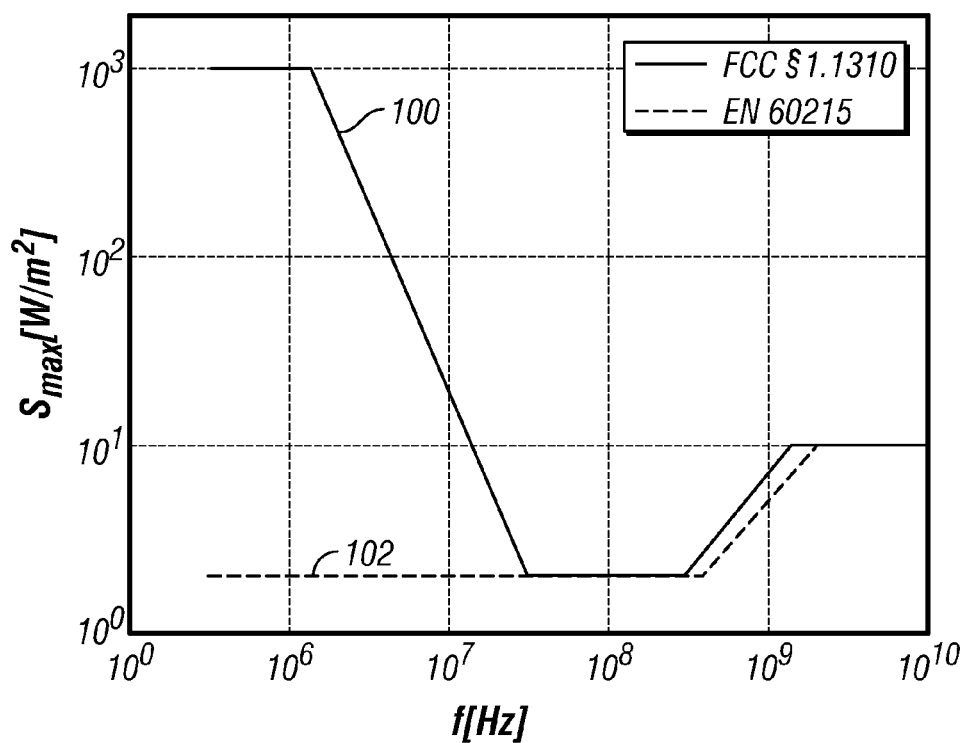
FIG. 1 plots maximum power density versus frequency under the FCC and EN limits, respectively, illustrating how the US limits for radiation exposure are more generous at frequencies below 30 MHz and could offset the effect of reduced antenna efficiency at low frequency.

Embodiments describe the use of wireless power transfer to a receiving source.

As used herein, the terms "wireless power" and "wireless energy" include without limitation any form of power or energy, including that associated with electric fields, magnetic fields, electromagnetic energy, or otherwise, that is transmitted between one point, area, location or device and another without having to use a wire line connection.

An embodiment discloses a wireless powering and charging system. An embodiment describes using a transmitter of a size allowing it to be embedded into another item, e.g., a desk or a shelf, or plugged into a wall, or embedded into another structure or surface such as a wall, floor, door, etc. A receiver is associated with a small mobile unit or client device carried by the user, or mounted on a portable device, vehicle, or with a stationary device such as a lamp, toaster, flat-screen TV on a wall, computer or computerized device, PDA, personal media device, etc. When the receiver is in range of the transmitter, power is delivered to the mobile unit.

In one embodiment, a wireless powering-charging system is disclosed, based on a transmitter that sends a substantially unmodulated signal or beacon (e.g., the carrier only). A receiver may be tuned to extract energy from the radiated field of the transmitter. The receiver powers an electronic device or charges a battery.

Other embodiments may use beacons that are slightly modulated.

Multiple receivers may be used. Multiple transmitters may be used to transmit to one or multiple receivers.

The antenna used by this system allows an efficient means of energy transmission and reception. The antenna is preferably of a small size to allow it to fit into a mobile, handheld device where the available space for the antenna may be limited. An embodiment describes a high efficiency antenna for the specific characteristics and environment for the power being transmitted and received.

Antenna theory suggests that a highly efficient but small antenna will typically have a narrow band of frequencies over which it will be efficient. Many of skill in the art have, therefore, avoided the use of these antennas, to enable more flexible transmit and/or receive characteristics. In an embodiment, an adaptive tuning circuit is used in certain configurations to allow tuning of an efficient yet narrowband antenna.

One embodiment describes an efficient power transfer between two antennas by storing energy in the near field of the transmitting antenna, rather than sending the energy into free space in the form of a travelling electromagnetic wave. This embodiment increases the quality factor (Q) of the antennas. This can reduce radiation resistance ($R_r$) and loss resistance ($R_l$).

In one embodiment, two high-Q antennas are placed such that they react similarly to a loosely coupled transformer, with one antenna inducing power into the other. The antennas preferably have Qs that are greater than 1000.

Another embodiment describes maximum Permissible Exposure (MPE) where the maximum exposure limits are defined by European and US standards (as well as others). They are defined in terms of power density limits (W/m$^2$), magnetic field strength limits (A/m) and electric field strength limits (V/m). The limits are related through the impedance of free space, 377 W.

In the US, the applicable standard is FCC CFR Title 47: §2.1091 Radiofrequency radiation exposure evaluation: mobile devices. A mobile device is a transmitting device designed to be used in such a way that the separation distance of at least 20 cm is normally maintained between the transmitter's radiating structure(s) and the body of the user or nearby persons. The limits to be used for evaluation are specified in §1.310 of Title 47.-§1.1310 Radiofrequency radiation exposure limits (see Table 1).

Table 1: FCC limits for radiation exposure Limits FOR MAXIMUM PERMISSIBLE EXPOSURE (MPE)

TABLE 1

FCC limits for radiation exposure
LIMITS FOR MAXIMUM PERMISSIBLE EXPOSURE (MPE)

| Frequency range (MHz) | Electric field strength (V/m) | Magnetic field strength (A/m) | Power density (mW/cm$^2$) | Averaging time (minutes) |
|---|---|---|---|---|
| (A) Limits for Occupational/Controlled Exposures ||||| 
| 0.3-3.0 | 614 | 1.63 | *(100) | 6 |
| 3.0-30 | 1842/f | 4.691 | *(300.1) | 6 |
| 30-300 | 61.4 | 0.163 | 1.0 | 6 |
| 300-1500 | | | 1/300 | 6 |
| 1500-100,000 | | | 5 | 6 |
| (B) Limits for General Population/Uncontrolled Exposure |||||
| 0.3-1.34 | 614 | 1.63 | *(100) | 30 |
| 1.34-30 | 824/1 | 2.191 | *(180.f$^3$) | 30 |
| 30-300 | 27.5 | 0.073 | 0.2 | 30 |
| 300-1500 | | | 1/1500 | 30 |
| 1500-100,000 | | | 1.0 | 30 | f = frequency in MHz
* = Plane-wave equivalent power density

NOTE 1 TO TABLE 1:

Occupational/controlled limits apply in situations in which persons are exposed as a consequence of their employment provided those persons are fully aware of the potential for exposure and can exercise control over their exposure. Limits for occupational/controlled exposure also apply in situations when an individual is transient through a location where occupational/controlled limits apply provided he or she is made aware of the potential for exposure.

NOTE 2 TO TABLE 1:

General population/uncontrolled exposures apply in situations in which the general public may be exposed, or in which persons that are exposed as a consequence of their employment may not be fully aware of the potential for or can not exercise control over their exposure.

In Europe, the applicable standard is EN60215. This has been derived from the ICNIRP (International Commission on Non-Ionizing Radiation Protection) guidelines [ICN], The limits are given in Table 2.

Table 2: European limits for radiation exposure

TABLE 2

European limits for radiation exposure
Table 2: European limits for radiation exposure

| Frequency range (MHz) | Electric field strength (V/m) | Magnetic field strength (A/m) | Power density (W/m$^2$) | Averaging time (min) |
|---|---|---|---|---|
| 0.15-1 | 87 | 0.73/f | — | 6 |
| 1-10 | 87/f$^{1/2}$ | 0.73/f | — | 6 |
| 10-400 | 28 | 0.073 | 2 | 6 |
| 400-2000 | 1375 f$^{1/2}$ | 0.0037 f$^{1/2}$ | f/200 | 6 |
| 2000-300,000 | 61 | 0.16 | 10 | 6 |

Figure 2:
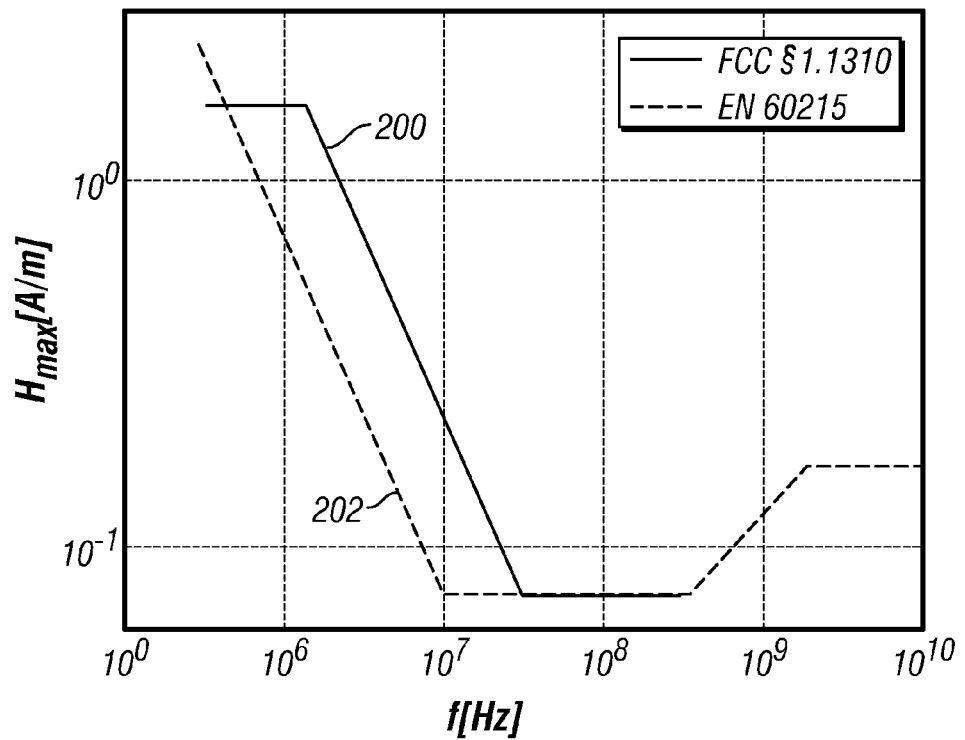
FIG. 2 plots maximum magnetic field strength versus frequency under the FCC and EN limits, respectively, illustrating how the US limits for radiation exposure are more generous at frequencies below 30 MHz and could offset the effect of reduced antenna efficiency at low frequency.

The power density limits and magnetic field limits are of particular interest in one embodiment. Using the data from Table 1 and Table 2, limit curves can be determined. FIG. 1 shows a plot of power density with the FCC limit curve 100, and the EN curve 102. FIG. 2 shows a plot of maximum H field, with the FCC curve 200, and the EN curve 202.

FIGS. 1 and 2 illustrate how the US limits are more generous at frequencies below 30 MHz and could offset the effect of reduced antenna efficiency at low frequency. This study tests a range of frequencies to see which frequencies are the best for wireless power transfer.

This application also provides an exemplary theoretical analysis of various aspects of wireless energy and power transfer.

Embodiments disclosed herein describe antenna types.

A loop antenna is a "magnetic" antenna and may be less sensitive to changes in its surroundings than a dipole, which is an "electric" antenna. The loop antenna may have certain advantages when the device is exposed to changes in its surroundings, e.g., when placed on a table, held in the hand, or put in a pocket, based on stray capacitance, or other effects. In an embodiment, an air loop antenna is used. Another embodiment may use a loop antenna with a ferrite core, or others may be used.

In one embodiment, an air loop antenna may be preferred over a loop antenna with a ferrite core. The air loop antenna may be more resistant to detuning from permanent magnets or other magnetic influences in its vicinity. The air loop antenna will, in general, be more efficient than the ferrite loop antenna, since the ferrite core can cause losses. The ferrite antenna is often heavier, and cannot typically have components placed "inside" it. In contrast, other components can be placed inside the loop of an air loop antenna. The form-factor of the loop may be modified or otherwise adapted to fit within a form-factor of certain portable devices being charged.

The same type of antenna may be used for both transmitter and receiver. The transmit and receive antennas can be the same or different sizes.

An embodiment describes a tuning circuit that becomes part of the antenna circuit. A typical loop antenna is inherently inductive. A capacitive element may be used in the tuning circuit to induce resonance in the antenna. Even though a loop antenna is less sensitive to changes in its surroundings than a dipole antenna, it will still be detuned to some degree by changes in its surroundings. Therefore, it may be desirable in certain embodiments to adaptively tune either the transmitter antenna or the receiver antenna or both, to maintain the quality of the link therebetween.

Adaptive tuning is achieved in one embodiment by changing the value of a capacitive element used in series with the loop antenna to adjust the resonant frequency of the circuit. The adaptive tuning circuit at the transmitter and/or at the receiver. A goal is to choose tuning components with high quality factors (Q) to ensure that that the Q of the overall receiver circuit is degraded as little as possible. In an embodiment, high Q is used to maximize efficiency, even at the cost of narrow bandwidth.

Figure 3:
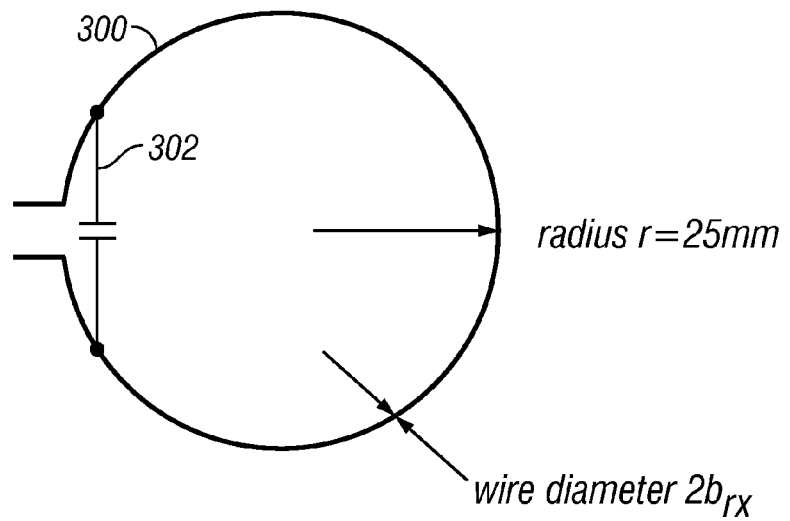
FIG. 3 illustrates a simplified schematic diagram of an air loop antenna, in accordance with a first set of exemplary embodiments of the present invention.

FIG. 3 illustrates an air loop antenna of an embodiment. The antenna may have maximum dimensions of 5 cm (i.e. a radius r of 2.5 cm) and N turns of wire 300 of diameter $2b_{rx}=500$ um is used for one embodiment. The antenna can, for example, be placed around the perimeter of a mobile device. The loop will be assumed circular, but can be of other shapes. A capacitor 302 is used with the loop inductive resonator to bring the loop antenna to resonance. The capacitor value may be obtained from the well known resonance equation:

$$\omega^2 = \frac{+1}{LC}$$

where ω denotes the angular frequency of resonance, L the inductance and C the capacitance.

By calculating the inductance of the air loop antenna using the Equation and a wire diameter of 500 urn, the required capacitance can be calculated for any of a number of frequencies.

Figure 4:
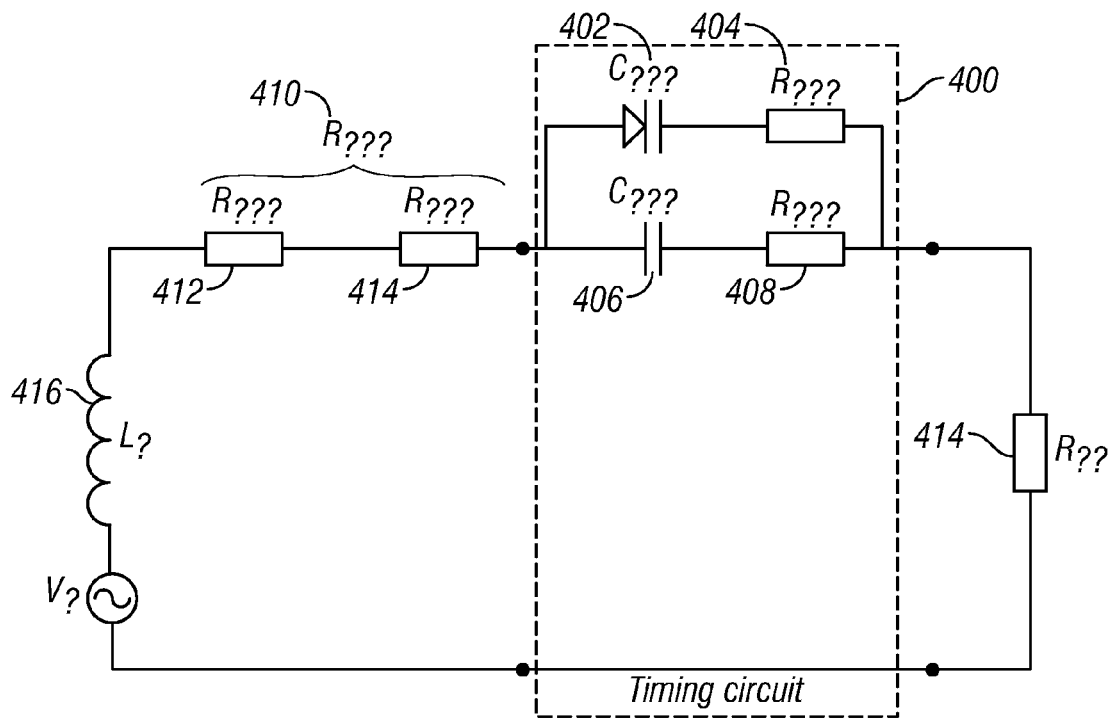
FIG. 4 illustrates a circuit diagram of a series-resonant circuit, operating to bring a receiving loop antenna to resonance and to maintain tuning, in accordance with the first set of exemplary embodiments of the present invention.

In one embodiment, the capacitor 302 can be a high Q fixed chip capacitor in parallel with a high Q varactor diode operating as a voltage-tunable capacitor to bring the receiver air loop to resonance and to maintain tuning. FIG. 4 shows a schematic of the series-resonant circuit formed with tuning circuit 400, that itself is formed of variable capacitance 402, in series with its equivalent series resistance 404. A fixed capacitor is shows as 406 in series with its ESR 408. The antenna overall ohmic resistance 410 is shown separated as radiation resistance 410 in series with overall antenna resistance 412. Load resistance 414 and inductance 416 are also shown.

In the circuit, the symbols have the following meanings:
$V_0$: The induced voltage across the loop antenna
$L_{rx}$: The inductance of the loop antenna
$R_{l\_rx}$, $R_{r\_rx}$, $R_{a\_rx}$: Receive-antenna loss (ohmic) resistance, radiation resistance and overall antenna resistance (the sum of the previous two)
$C_{var}$, $R_{esr\_var}$: The capacitance of the tuning varactor and its associated Equivalent Series Resistance (ESR)
$C_{fix}$, $R_{esr\_fix}$: The fixed capacitance and its associated ESR
$R_{load\_rx}$: The load resistance One embodiment selects a tuning range of roughly +/−5 percent of the chosen operating frequency, so as to cover variations in the capacitance and detuning from external factors. The varactor's tuning range could be approximately +/−10 percent the fixed capacitance value. Components used preferably have a high Q, so that they degrade the overall Q of the circuit as little as possible.

In one embodiment, tuning is carried out solely at the transmitter. In this embodiment, no varactor diode need be located at the receiver and the transmitter tracks the receiver resonant frequency. This is dependent on how much resonant frequency of the receiver loop is affected by changes in the environment near the loop. The opposite configuration can also be used.

At higher frequencies, or with larger loop dimensions, or with more loop turns, a very small capacitance may be required to bring the loop to resonance. In an embodiment, only a varactor diode or only a fixed capacitor would be used without the other.

Another effect to be considered is the self-resonance of the loop, especially at higher frequencies. This effect will occur as inter-winding capacitance and stray capacitances on the loop antenna come into resonance with the inductance of the winding itself. This decreases as frequency increases.

At a lower operating frequency such as 1.3 MHz, a larger fixed capacitor will be required. For example, the loop antenna with the dimensions given in FIG. 3 with 5 turns of loop antenna would require a fixed capacitance of about 3 nF. Capacitance variations of +/−1 percent (30 pF) are typical for these types of capacitors. As will be shown, this exceeds the tuning range of most available tunable capacitors. Therefore, at low frequencies, one embodiment locates the adaptive tuning only in the transmitter.

Increasing the operating frequency or increasing the number of turns allows reducing the size of the fixed capacitance. A larger number of turns may make the packaging more difficult. Therefore, with a large number of turns, practical implementation for certain types of applications could become difficult. A higher frequency therefore might allow certain benefits in applications where this factor might otherwise be limiting.

However, at frequencies of 250 MHz and above, the size of fixed capacitor required is extremely small—e.g. on the order of 1 pF for N=1, and even less for more turns. At these frequencies, the fixed capacitor can be eliminated altogether in some cases, and only a very small tuning capacitor used. This physical limit on capacitor size also places a limit on the frequencies that can be used, for given loop dimensions. A smaller receiver loop size would allow a higher frequency or more loops to be used.

Exemplary high Q/low ESR capacitors with capacitances from the low picofarad to the low nanofarad range can be obtained commercially, e.g. from AVX Corp. Details of some potentially suitable AVX capacitors are tabulated in Table 3, although any number of other devices may be used.

Table 3

TABLE 3

| Capacitor Family (all AVX) | Capacitance Range of Family | Tolerance | Q | ESR | Voltage Rating | Dimensions |
|---|---|---|---|---|---|---|
| HQ series, E case | 3.3 pF to 6800 pF | +/−0.25 pF to +/−1% | Varies according to capacitance and frequency - see FIG. 19 | Varies according to capacitance and frequency - see FIG. 20 | 600 V to 7200 V | 9.4 mm × 9.9 mm × 3.3 mm |
| SQ AQ or CDR[1] series, style 13 or 14 | 0.1 pF to 5100 pF | +/−1% | Claimed greater than 10000 at 1 MHz | Approx 0.004 at 1 MHz | 50 V | 2.79 mm × 2.79 mm × 2.59 mm |

Note that in general, Q ESR and C are related by the following equation:

$$C = \frac{1}{\omega R_{esr} Q}$$

Another embodiment uses MEMS (Microelectromechanical Systems) varactors. This may lower the power consumption.

The circuit of FIG. 4 at resonance is analyzed to evaluate performance. In a first approach, the varactor will be replaced by a fixed value capacitor one-tenth the size of the main fixed capacitor. The AVX data will be used for both capacitors. The tuning circuit 100 in FIG. 4 is modeled as a single R/C impedance. Values used are:

$I_{rx}$ is the current in the receiver loop.

$P_{rx}$ is the power at the load resistor.

$C_{ser}$ is the equivalent series capacitance of the fixed capacitor and varactor, and $R_{ser}$ is the equivalent series resistance of the fixed capacitor and varactor.

At resonance, the reactances can be neglected since $X_L = -X_c$. Only the resistive (real) losses in the circuit are considered.

The inventors found that when the resistances of the tuned antenna are matched to the load resistance, the maximum amount of power $P_{rx}$ is available at the load. In other words, the optimum condition is when RL_rx+Rr_rx+R_ser=Rload_rx. The values may vary by 20% while still staying within "optimum" resonance.

In the embodiment, therefore, the transmitter circuit is modeled as a resonant loop where the loop is power-matched to the source. An exemplary air loop antenna with maximum dimensions of 20 cm (i.e. a radius r of 10 cm), a wire radius of 1 mm and a single turn (N=1) is used for an embodiment, although other types, sizes and dimensions of antenna may be used for the transmitter in other embodiments.

In one embodiment, the transmitter antenna could, for example, sit vertically on a bench or a table inside a home, within a wall, around a wall power outlet, on or within a garage floor, behind a refrigerator, etc. To simplify calculations, the loop will be assumed circular, as FIG. 3. A single wire loop transmitting antenna of FIG. 3, having a wire diameter of 10 cm radius, wire radius of 1 mm, has an inductance of approximately 840 nH. Different frequencies will require different capacitance values for resonance with this antenna. For example, 1.3 MHz will require a capacitor of 17.85 nF; 13.56 MHz will require 164.1 pF; 64 MHz will require 7.365 pF; 250 MHz will require 0.483 pF and 500 MHz will require 0.121 pF.

A number of different antennas are described as embodiments herein. For testing of the embodiments, the antennas were built of 1.5 mm² copper wire and fixed onto a wooden frame.

The transmit antenna has a radius of 0.2 m, 6 turns, and 3 MHz operating frequency. The matching is realized with two tunable capacitors. The receiving antenna has a radius of 0.1 m. Before considering power transfer/pathgain, the antennas were tuned and measured independently. The resulting characteristics are summarized in Table 6.

TABLE 6

| | Transmitting antenna (TX) | Receiving antenna (RX) |
|---|---|---|
| Measured unmatched characteristics @ 3 MHz | | |
| R [Ω] | 23 | 1.7 |
| L [μH] | 43 | 12.5 |
| Used matching network | | |
| $C_s$ [pF] | 36.5 | 33 |
| $C_p$ [pF] | 27.6 | 187 |
| Match [dB] | −24 | −24 |
| 3 dB-bandwidth [kHz] | 34 | 90 |
| Quality factor Q | 89 | 33 |

A quality factor increase may further increase power transfer. The quality factor, for example, can be increased using a Matlab simulation. The mathematical investigations done for the simulation, leads to the following approximation for the path gain:

$$\eta(x) = \frac{\pi^2 a^6 Q_{ul}^2}{16 x^6 \left[\ln\left(8\frac{a}{b} - 2\right)\right]^2}$$

Where:
a=loop radius [m]
b=wire radius [m]
$Q_{ul}$=unloaded quality factor
X=distance between transmitter and receiver antenna [m]

The Equation above shows that for a practical antenna, the loop radius has a high impact on the path gain.

Second Embodiment Antennas

Figure 5:
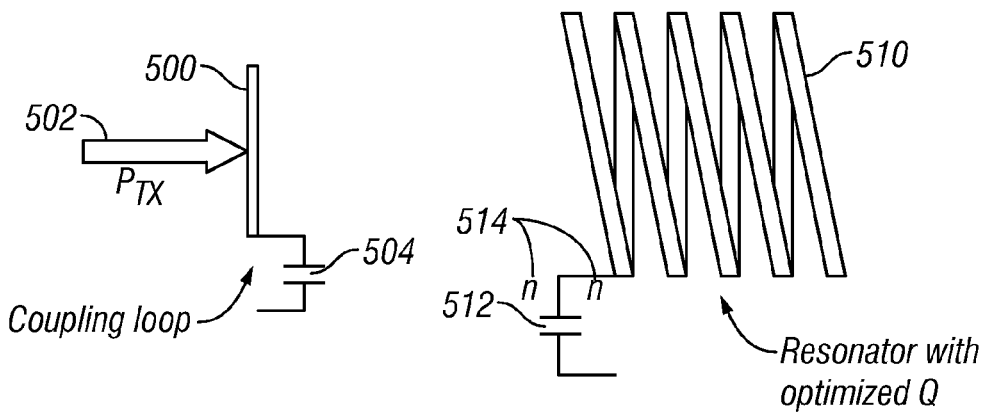
FIG. 5 illustrates a simplified schematic diagram of a wireless powering-charging system, configured to obtain a maximized power transfer between transmitting and receiving antennas, in accordance with a second set of exemplary embodiments of the present invention.

FIG. 5 illustrates a second embodiment of the antennas. This embodiment obtains a maximized power transfer between a coupling loop 500 to which the transmitted power 502 is delivered. The coupling loop radiates to a resonator 510 with optimized Q. This embodiment uses a coupling loop which acts as a resonator instead of a coupling network made of two capacitors. This reduces losses by omitting a matching network. The coupling between the coupling loop and the antenna can be conceptualized as an ideal transformer.

The antenna may be made out of e.g., copper tube or the like in order to decrease the loss resistance by increasing the wire surface. In addition, the surface may be plated with silver (Ag) or another such high conductance material well known in the art. With this type of construction, a quality factor in the order of 103 is achieved, as described in greater detail below. The resonator part of the antenna may also be optimized for a high quality factor (Q). This is done by increasing the number of turns, increasing the surface of the wire and reducing dielectric losses due to isolation or the mounting of the antenna.

To tune the resonance frequency of the antennas, tunable capacitors 504, 512 may be integrated at the bottom of both antennas. The capacitors may be metal plates that are tunable by using three screws 514 to change the distance between the two plates of the capacitor. The capacitors dominate the self-capacitance (Cs) of the antennas. Table 6A illustrates the characteristics of these antennas.

TABLE 6A

|  | Transmitting antenna (TX) | Receiving antenna (RX) |
|---|---|---|
| Radius [m] | 0.085 | 0.085 |
| Length [m] | 0.078 | 0.078 |
| Number of turns | 7 | 7 |
| Operating frequency [MHz] | Resonance | Resonance |

The exemplary embodiments of the antennas are built of copper tube with an outer diameter of 6.0 mm. The surface is silver-plated. This protects the copper from corrosion and slightly increases the conductivity of the surface.

With an exemplary plate-distance of the tuneable capacitor of 8 mm, the resulting calculated resonance frequency is 14.4 MHz.

Using a Q of 1300 at both transmit and receive antenna, pathgain is approx. −10 dB, at 1 m, which corresponds to a factor of 0.1. In other words, a transmitting power of 10 watts must be used to receive 1 W at the receiver.

The system should be defined around the unloaded Q ($Q_{ul}$) of the antennas, starting with:

$$Q_{ul} = \frac{1}{R} \cdot \sqrt{\frac{L}{C}},\qquad \text{Equation 1-1}$$

The total loss resistance of either the Tx or Rx antenna can be defined by:

$$R = \frac{1}{Q_{ul}} \cdot \sqrt{\frac{L}{C}}.\qquad \text{Equation 1-2}$$

At resonance, it can be written as $$p_{in} = I^2 \cdot R.\qquad \text{Equation 1-3}$$

The resulting current in the TX-antenna can now be specified by $$I = \sqrt{\frac{P_{in}}{R}}.\qquad \text{Equation 1-4}$$

Using Equation 1-2, the current can be rewritten as $$I = \sqrt{P_{in} \cdot Q_{ul} \cdot \sqrt{\frac{C}{L}}}.\qquad \text{Equation 1-5}$$

The magnitude of the H-field generated by the current in the TX-antenna in a distance x is $$H(x) = \frac{r_A^2 \cdot I \cdot N}{2 \cdot \sqrt{(r_A^2 + x^2)^3}},\qquad \text{Equation 1-6}$$

and induces a voltage $$U_{ind}(x) = 2\pi f_{res} \cdot N \cdot \pi r_A^2 \cdot \mu_0 \cdot H(x)\qquad \text{Equation 1-7}$$

in the RX-antenna. The parameter $r_A$ is the radius, N the number of turns of the loop-antenna. The available output power $P_{out}$ can now be calculated with $$P_{out}(x) = \frac{U_{ind}(x)^2}{4 \cdot R}.\qquad \text{Equation 1-8}$$

$$P_{out}(x) = U_{ind}(x)^2 \cdot \frac{Q_{ul}}{4} \cdot \sqrt{\frac{C}{L}}.\qquad \text{Equation 1-9}$$

Finally, pathgain is defined as $$\eta(x)_{dB} = 10 \cdot \log_{10}\left(\frac{P_{out}(x)}{P_{in}}\right).\qquad \text{Equation 1-10}$$

To further simplify and understand the behavior of Equation 1-10 and Equation 1-9, models for L and C are needed. The capacitance can simply be defined over the resonance frequency $$C = \frac{1}{\omega_0^2 \cdot L}.\qquad \text{Equation 1-11}$$

For the inductivity, an empiric formula was found to be the most accurate for the type of antenna used in this system.

$$L = \frac{\mu\pi \cdot N^2 r_A^2}{0.9 r_A + l_A}\qquad \text{Equation 1-12}$$

The parameter $l_A$ is the width of the antenna.

Under the assumption that the separation x between the antennas is large compared to the radius of the antennas $r_A$ ($x > r_A$), and with Equation 1-11 and Equation 1-12, Equation 1-10 can be written as:

$$\eta(x)_{dB} = 10 \cdot \log_{10}\left(\frac{r_A^2 \cdot Q_{ul}^2 (0.9 r_A + l_A)^2}{16 x^6}\right)\qquad \text{Equation 1-13}$$

The term in brackets in 1-13 is the linear pathgain. Note that this linear pathgain is not a direct function of the frequency or the number of turns, although these parameters are implicitly contained in the quality factor. The pathgain is approximately proportional to loop radius $r_A^6$, if the loop radius is much larger than the loop length $l_A$. It is inversely proportional to the separation $x^6$ between the antennas. It is also proportional to the quality factor $Q_{ul}^2$.

For a given antenna dimension, as the quality factor is increased, the pathgain is improved. This is validated in an embodiment via simulation. The above equations were simulated using Matlab® to test antennas with different sizes and quality factors. The following parameter set was defined to run the script:

% Parameter definitions
Q=1000; % target unloaded quality factor [1]
N=7; % number of turns [1]
r_loop=85e-3; % radius of loop antenna [m]
r_wire=3e-3; % radius of wire [m]
pitch=12e-3; % distance between two turns (center to center) [m]

freq=13.0e6; % system frequency [Hz]
dist=1:0.1:3; % distance of antennas [m]
P_in =1% input power [W]

The resulting simulation showed a pathgain variation of −60 dB per decade which is caused by the term $x^6$ in Equation 1-13. If Q is doubled, for example from 1000 to 2000, pathgain increases by 6 dB. If the distance is doubled, pathgain decreases by 18 dB. The exemplary defined parameters are valid for both TX- and RX-antennas, and hence can assist with forming an optimal antenna for the parameters.

The simulation also calculates the reactive voltages. The reactive voltages occurring at the inductance and the capacitance are directly proportional to the quality factor and proportional to the square root of the transmitting power as set forth in Equation 1-14.

$$U_{LC} = Q_{ul}\sqrt{P_{in} \cdot R} \qquad \text{Equation 1-14}$$

Both reactive voltages will be very high in a practical implementation, thus planning for those voltages becomes more critical. With a Q of 1000 and a transmitting power of 10 W, the voltages may be 2.7 kV. If a plate capacitor is used with a plate distance of 0.01 m, the resulting field strength is 270 kV/m. Capacitors that can withstand these high voltages become critical. For example, it may be necessary to use 2000 V or 3000 V or higher voltage withstanding capacitors. It is believed that at least one reason why systems of this type did not operate properly in the past is that they were not properly sized for the amount of reactive voltage that was actually present. In fact, the unexpectedly high voltage above 2 KV is found as part of these reactive voltages even when much smaller voltages are being transmitted. This unexpectedly high voltage needs to be handled by the circuit components.

Definition of the Quality Factor also becomes important, because a major focus of the antenna design process is on optimizing the quality factor. Accordingly, the following describes an in-depth analysis of Q.

The fundamental equation about the quality factor is given by Equation 1-1 above.

$$Q_{ul} = \frac{1}{R} \cdot \sqrt{\frac{L}{C}} \qquad \text{Equation 1-1}$$

Figure 6:
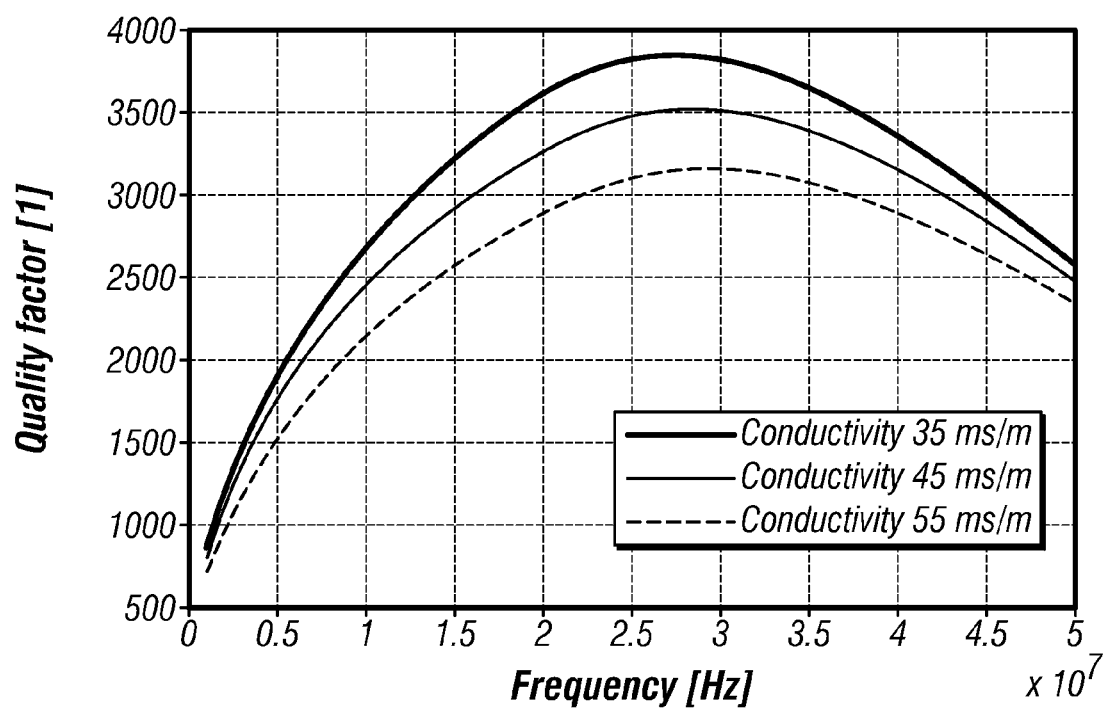
FIG. 6 plots high quality factor (Q) versus frequency, illustrating optimization of power transfer by using antenna design, in accordance with the second set of exemplary embodiments of the present invention.

FIG. 6 illustrates a plot of Q vs frequency for a number of different frequencies.

Note that the proportion of L and C is important in this equation. For a given resonance frequency, there are an infinite number of possible L-C combinations. However, higher Q is obtained when the inductance L is as high as possible compared to the capacitance.

The quality factor is also inversely proportional to the resistance R. This resistance consists of a loss resistance ($R_l$) and a radiation resistance ($R_r$). Both should be minimized in order to increase the quality factor.

The loss resistance is dependent of the material used to build the antenna, and due to the skin effect of frequency used for the system. A highly conductive material with good skin effect is preferable.

A high resonance frequency increases losses and hence decreases the quality factor. This is why the curve of FIG. 6 decreases at the upper end of the frequency-scale. However, a lower resonance frequency is obtained by increasing the capacitance. This decreases the L/C ratio, and since L is independent of the frequency, this lowers Q. Hence, the FIG. 6 curve shows how Q decreases at both the upper and lower end of the frequency-scale, making an ideal quality factor around a frequency of 29 MHz for the given antenna dimensions.

This shows an ideal frequency or frequency range for each antenna geometry.

The resonance frequency of 13 MHz used during testing described herein is below this ideal frequency. This is because self resonance, which is the resonance frequency without the tunable capacitor, below the resonator of the antennas is around 35 MHz. If the resonator is used at this frequency without the tunable capacitor, the sensitivity of the antenna against close-by objects may become significant.

An embodiment minimizes this effect and at the same time makes it possible to change the resonance frequency. A tunable capacitor of a value which dominates the self-capacitance of the resonator is used for this purpose. The added capacitance lowers the resonance frequency of the antenna.

Quality factor typically cannot be measured directly. Instead, the definition $$Q = \frac{\omega_0}{\Delta\omega} \qquad \text{Equation 2-1}$$

may be used as a starting point, where $\Delta_0$ is the center or resonance frequency and $\Delta\omega$ corresponds to the 3 dB-bandwidth. Q can therefore be found by measuring the two parameters $\omega_0$ and $\Delta\omega$.

The 3 dB-bandwidth can be found as follows. The impedance Z of a first order series RLC-circuit is given by $$Z = R + j\omega L + \frac{1}{j\omega C} \qquad \text{Equation 2-2}$$

With the help of $$\omega_0 = \frac{1}{\sqrt{LC}} \qquad \text{Equation 2-3}$$

and $$Q = \frac{1}{R} \cdot \sqrt{\frac{L}{C}}, \qquad \text{Equation 2-4}$$

The inductance L and capacitance C can be written in terms of Q and $\omega_0$ $$L = \frac{QR}{\omega_0} \qquad \text{Equation 2-5}$$

$$C = \frac{1}{QR \cdot \omega_0} \qquad \text{Equation 2-6}$$

If Equation 2-5 and Equation 2-6 is used in Equation 2-2, impedance can be expressed with $$Z = R + j \cdot QR\left(\frac{\omega}{\omega_0} - \frac{\omega_0}{\omega}\right). \qquad \text{Equation 2-7}$$

The quality factor can also be used to define the bandwidth (like in Equation 2-1)

$$\frac{\Delta\omega}{2} = \frac{\omega_0}{2Q}. \qquad \text{Equation 2-8}$$

The impedance phase is given by the inverse tangent of the imaginary part of Z, divided by the real part of Z. In this division, R cancels out. If in addition Equation 2-8 is used and the function is evaluated at the upper cut-off frequency, then the phase is given by $$\varphi\left(\omega_0 + \frac{\Delta\omega}{2}\right) = \tan^{-1}\left(Q\left(\frac{\omega_0 + \frac{\omega_0}{2Q}}{\omega_0} - \frac{\omega_0}{\omega_0 + \frac{\omega_0}{2Q}}\right)\right) \qquad \text{Equation 2-9}$$

If the expression in the bracket is simplified, the phase gets dependent only from Q.

$$\varphi\left(\omega_0 + \frac{\Delta\omega}{2}\right) = \tan^{-1}\left(Q + \frac{1}{2} - \frac{Q}{1 + \frac{1}{2Q}}\right) \qquad \text{Equation 2-10}$$

If Q increases, the function in the bracket tends to 1.

$$\varphi\left(\omega_0 + \frac{\Delta\omega}{2}\right) = \tan^{-1}(1) = \frac{\pi}{4}. \qquad \text{Equation 2-11}$$

The result from Equation 2-11 corresponds to an angle of 90 degrees which implies that the imaginary part of Z is equal to the real part of Z. Those two points can then be found with a network analyzer, and then Equation 2-1 can be used to calculate Q. Hence, using this framework, the Q value of such an antenna can be actually determined.

Figure 7:
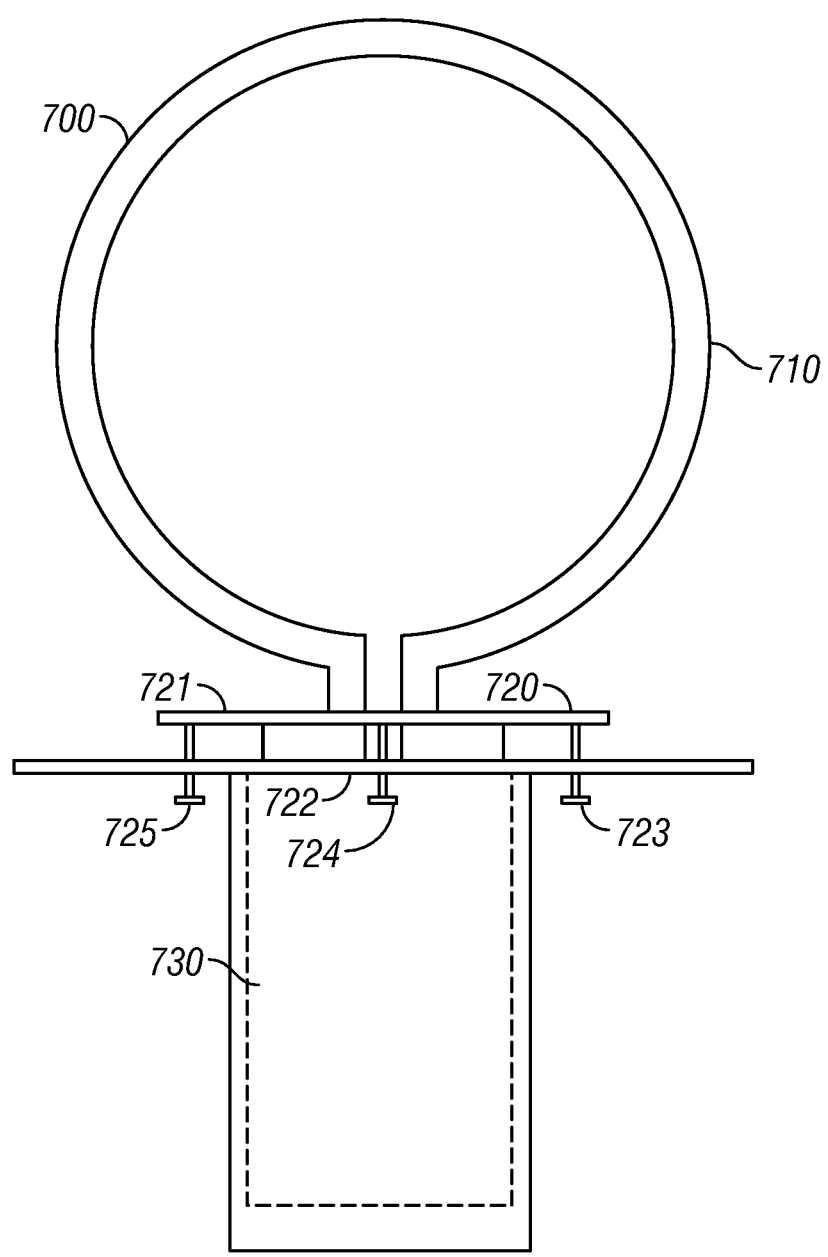
FIG. 7 illustrates a physical implementation of an antenna, in accordance with the second set of exemplary embodiments of the present invention.

A second embodiment of the antenna is shown in FIG. 7. A coupling loop 700 is placed approximately 0.1 m away from the main part of the antenna 710. A plate capacitor is formed between two copper plates 721, 722. Screws 723, 724, 725 are formed of a capacitively-inert material such as polyimide. These screws are used to adjust the capacitance provided by the tuneable capacitor 720 and in turn adjust the resonance frequency of the antenna.

A glass body 730 or other dielectric may be below the antenna to minimize losses due to obstacles below the antenna.

Moreover, as described above, surface conduction is important to maximize Q. A silver plating or other non-corrosive material, may be applied to protect the copper from corrosion.

The coupling loop 700 may be formed of the same copper tube material, but has only one turn and about half the diameter of the antenna. The coupling loop is placed around 0.1 m away from the antenna to get a 50 Ohm matching.

The following explains how the resonance frequency of the antenna parts can be determined. In the following equations, L is the inductance of the resonator itself, Cs is the self-capacitance of the resonator and $C_T$ is the tuneable capacitor associated with the resonator, $R_r$ is the radiation resistance, $R_l$ the loss resistance of the resonator.

$$L = \frac{\mu_0 \pi \cdot N^2 r_A^2}{0.9 r_A + l_A} \qquad \text{Equation 3-1}$$

where:
$r_A$ = loop radius
$N$ = number of turns
$l_A$ = length of antenna
$\mu_0 = 1.2566 \cdot 10^{-6}$ $$C_S = \frac{\pi^2 \cdot 2 r_A \cdot \varepsilon_0}{\ln\left(\frac{p}{2 r_A} + \sqrt{\left(\frac{p}{2 r_A}\right)^2 - 1}\right)} \qquad \text{Equation 3-2}$$

where:
$p$ = pitch of the antenna,
corresponds to the distance between
two turns plus the diameter of a turn
$\varepsilon_0 = 8.8542 \cdot 10^{-12}$
Note: see [GRA] for a derivation of this formula $$C_T = \frac{\varepsilon_0 \cdot A}{d} \qquad \text{Equation 3-3}$$

where:
$A$ = area of the plate capacitor
$d$ = distance between the plates
Note: this is an approximate formula because fringing is neglected. The real capacitance is higher than the calculated.

$$f_0 = \frac{1}{2\pi \cdot \sqrt{L \cdot (C_T + C_S)}} \qquad \text{Equation 3-4}$$

$$R_r = 320 \pi^4 N^2 \left(\frac{\pi \cdot r_A^2}{\lambda^2}\right) \qquad \text{Equation 3-5}$$

where:
$\lambda$ = wavelength at the frequency $f_0$ $$R_l = 1.25 \cdot \frac{N \cdot \pi \cdot r_A}{r_w} \cdot \sqrt{\frac{f_0 \cdot \mu_0}{\sigma \cdot \pi}} \qquad \text{Equation 3-6}$$

where:
$\sigma$ = conductivity of the metal used for the antenna, $45 - 10^6$ S/m used for calculations
$r_w$ = radius of the copper tube Table 8 shows the values obtained for the current values of antenna parameters.

TABLE 8

| | |
|---|---|
| L [µH] (calculated value) | 9.05 |
| $C_S$ [pF] (calculated value) | 1.9 |
| $C_T$ [pF] (calculated value with the plate-distance varying from 5 mm-15 mm) | 6.2-18.6 |
| $R_r$ [Ohm] | 0.0028 |
| $R_l$ [Ohm] | 0.264 |
| $f_{R65}$ [MHz] (measured) | 12.5 |
| Quality factor Q (calculated) | 2780 |
| Quality factor Q (measured) | 1300 |

An exemplary test arrangement for the pathgain-measurement may be carried out to obtain the actual values. This measurement may completely decouple the transmitter from the receiver, to avoid power transfer on the surface of the coaxial shields and on the power lines. A signal generator and a battery powered spectrum analyzer may be used on the transmitter and the receiver side respectively.

To measure the quality of the matching, the energy returning from the transmitting antenna is measured with a power meter which was connected through a directional coupler. The forward coupling port of the directional coupler was terminated with a 50 Ohm load. During the measurements, the matching was at least 20 dB (return loss). Matching can be varied by adjusting the distance between the antenna and the coupling loop.

On the receiver side, the spectrum analyzer is directly connected to the receiving antenna.

The same resonance frequencies are used for both antennas. Detuning results in a dramatically reduced power transfer. The receiving antenna may use a tuning aid, e.g., a Teflon bar that is selectively insertable into the tunable capacitor of the antenna, resulting in a resonance-shift of approximately 40 kHz, or may use an adjustable capacitor as previously described. For each distance measured, the receiving antenna is tuned to receive the maximum power available. The transmitting antenna is tuned by slightly adjusting the signal generator's frequency.

Table 9 shows the measured pathgains.

TABLE 9

| Distance [m] | Level at receiver [dBm] | Level at transmitter [dBm] | Pathgain [dB] |
|---|---|---|---|
| 1.1 | 3.3 | 12.5 | −9.2 |
| 1.5 | −3.7 | 12.5 | −16.2 |
| 2.0 | −10.5 | 12.5 | −23.0 |
| 2.5 | −18.5 | 12.5 | −31.0 |
| 3.0 | −25.3 | 12.5 | −37.8 |

Moreover, since the reactive voltage can easily exceed several kV, it may be useful to test the antenna prototypes to determine that reactive voltage, in order to allow determination of proper sizing for the capacitors. An electrically decoupled system may be used. A source signal from the signal generator is amplified by a 50 dB RF amplifier. The 20 dB attenuator in-between is used to limit the available power on the TX antenna.

The 3 dB attenuator after the amplifier is used to protect the amplifier in case of a mismatched antenna. To measure the quality of the matching, a power meter is used to show the energy returning from the antenna. On the receiver side, a small light bulb (50 Ohm/3 W) may be used to indicate the received power. Tuning and matching was realized by using the tuning aid, by varying the frequency of the signal generator and by varying the distance between the antennas and the coupling loop.

The results are summarized in the Table 10:

TABLE 10

| Distance [m] | 1.2 |
|---|---|
| Pathgain in dB | −11 |
| Transmitting power [W] | 10 |
| Receiving power [W] | 0.8 |
| Approximate reactive voltage [kV] | 3.1 |
| Approximate field strength in the tuneable capacitor [kV/m] | 310 |

In one embodiment, sensitivity to close-by objects or humans may cause a shift of the resonance frequency due to e.g., stray capacitance. This may be mitigated by a shield, e.g., a slotted or other shield, disposed around the antenna.

In another embodiment, a piece of mica which has a high dielectric strength and very good isolating capabilities is used in place of the polyimide screws noted above. This also raises the quality factor. It is postulated suggesting that less energy is absorbed by the mica compared to the polymer.

In another configuration, very thin pieces of mica or Teflon are used to hold the capacitor and limit transmitting power.

There is a tradeoff between Q and bandwidth. Due to the high quality factor, the bandwidth of the exemplary second antennas is somewhat narrow, e.g., around 9 kHz at a resonance frequency of 13 MHz. This results in certain tuning requirements, because both antennas have to work on almost exactly the same resonance frequency. Hence, in another embodiment, the antenna sensitivity to approaching objects as described above is reduced using the shield described above. An electronic tuning circuit may be used to automatically tune the antenna circuit(s) to maintain coherence. The detuning issue becomes especially important in a system like this where the Q is very narrow. This narrow Q implies narrow bandwidth, which requires that the tuning be more accurate.

To further evaluate the effects of various external factors or design factors on Q, various aspects of the experimental setup are considered, including e.g. the glass body under the antenna, the piece of mica in the capacitor, the losses of the coupling loop, and the losses of all the objects within the near field of the antenna.

To evaluate these factors, the environment of the antenna should be as ideal as possible. Therefore, the exemplary antenna was suspended with two thin nylon strings. Two coupling loops are used to measure transmission (S 12/S21) instead of reflection (S 11). The coupling loops were placed on both sides of the antenna, about 0.6 m away from the antenna, to achieve an undercritical coupling. That is, when an equal amount of power is dissipated in the external circuit as in the resonator itself, the coupling is said to be critical (and the antenna is matched). An undercritical coupling means that more power is dissipated in the resonator than in the external circuit, while an overcritical coupling means that more power is lost in the external circuit than in the resonator.

The theoretically expected Q for this embodiment is 2877. The realized Q of 2263 is 78.6% of the theoretical value. The theoretical value was almost reached in this test. It was also noted that higher Q, however, may make the antenna more susceptible to influence by its environment. Thus, in practice, the Q will likely always be lower than the theoretical value.

A second measurement showed another characteristic of the quality factor. The loaded quality factor $Q_L$ should be half of the unloaded quality factor ($Q_{ul}$) under the condition when the resonator is critically coupled.

The foregoing transmitter and receiver apparatus (e.g., antenna, and any associated electronic or electrical components) may also be combined in another embodiment as a transceiver: i.e. a device adapted to both transmit and receive power. This may comprise for example a common form factor (e.g., a single unit or "box" having both transmit and receive antennas and circuitry disposed therein). Moreover, the device may be used as a repeater to receive energy from one source via the receive antenna, and then transmit the received power to another source (or back to the same one) using the transmit antenna. These events (transmission and reception) may occur at the same time or with one delayed relative to each other. Values can be modified depending on the polarization, strength, geometry, relative spacing and placement, and other factors associated with the transmit and receive antennas, or may also be conducted according to any number of well known multiple access schemes such as e.g., frequency division or FDMA (e.g., wherein the resonant frequency of the first antenna (receiver or transmitter) is different or separated from that of the second antenna (transmitter or receiver). As yet another option, the two antennas may use the same or different frequency, and be time-divided or slotted as to their operation (e.g., TDMA).

In another alternative, a "CSMA" like approach may be used (whether with our without "collision detection"), such as where one device actively or passively detects or senses the activity of the other, and adjusts its behavior accordingly. In one such embodiment, the transmitter, before transmitting, detects the state of the receiver (e.g., whether in resonance, generating current, etc.) and uses this as a gating criterion for transmission).

Another embodiment uses a "resonant frequency hopping" approach, wherein multiple access or other aims, such as defeating or mitigating Rayleigh or antenna diversity fading or other such issues, is accomplished by way of periodically or deterministically or psuedorandomly hopping the resonant frequency as a function of time. For example, the transmitter and receiver may "seed" corresponding deterministic algorithms so as to mutually generate a common hop sequence that allows them to maintain synchronized. Alternatively. "in-band" (e.g., modulated power signal) signaling may be used to transmit the hop sequence in advance (or as it proceeds) to the receiver from the transmitter; e.g., "I will hop to frequency X at next interval, and frequency X+Y after that . . . ", and so forth. A separate low power transmitter, e.g., RF or Bluetooth, can be used to synchronize the specific information. Clocking information may also be sent in an analogous way.

In another embodiment, a passive "collision detection" or CD approach is used, such as where the transmitter attempts to transmit, and determines whether an interfering operation is occurring at the same time. For example, the determination may be by detecting a resonant frequency, a transmission efficiency, a feedback from a receiver, or some other detection. This interfering operation may be caused by the operation of the receiver, a parasitic or stray capacitance effect, a loss of tuning, or other similar effect.

The transmitter may take an action at that point to avoid the issue.

In an embodiment, since the interference is typically temporary, the transmitter can terminate the ongoing transmission and retry a later time. One example of this is via a random backoff via an anti-collision algorithm. One embodiment allows the power has transmitted to be stored in a storage part such as a battery. Because of this, the device can the power transmission can be stopped temporarily; while still allowing the powered device to operate.

The transmitter can attempt to tune itself to a different resonant frequency so as to mitigate the interference and/or attempt to tune or otherwise vary the operation of the receiver.

Another option is to increase the gain so as to increase an energy transfer rate. This may operate to "blast through" the interference as it were).

A system of adjusting polarization or orientation of transmitter and/or receiver can be used, such as via a motor drive or similar mechanism that physically alters the position of the antenna(s).

Any combination of the above can alternatively be used. These features can be implemented at the transmitter, and/or at the receiver basis, or in tandem or coordination between the transmitter and receiver.

Another embodiment uses signaling information between the devices that relates to the level or rate of power transfer as determined by the receiver (e.g., "here's what I'm actually receiving, so you can compare this to what you are actually sending to tune yourself, transmitter"). Moreover, the aforementioned multiple access schemes can be implemented in this fashion; e.g., backoff or CD based on a drop in receiver received power as communicated back to the transmitter via a communication channel.

As yet another alternative embodiment, multiple transmitters and/or receivers may be used, and the aforementioned features implemented as between the multiple transmitters (and/or receivers). For example, the FDMA, TDMA, CSMA or CD techniques may be applied as between two potentially conflicting transmitters.

The foregoing functions may be implemented at an electrical or electronic component level; e.g., via simple gate logic or the like implemented as anything from discrete components through highly integrated circuits, as computer programs or applications running on e.g., a micro-controller or digital processor, via firmware disposed on a IC, manually, or in hardware to the degree applicable (e.g., electromechanical tuners, motors, etc.)

Moreover, the present application contemplates the dynamic alteration or variation of one or more antenna or circuit parameters by environmental characteristics. For example, this can change antenna characteristics. The characteristics that can be changed can include tuning capacitance, resistance value, radius of the loop or coil, e.g. via a thermal effect that causes elongation or contraction of the material used to form the antenna loop(s), thereby changing its effective radius, the properties of the antenna or components in proximity thereto (e.g by selectively applying a particular electric field or magnetic field, alignment of dipoles within the material or components might be selectively altered, thereby affecting the properties of the antenna), as well as electrical or electronic processing such as power signal processing, filtration, modulation, and others.

For example, in one embodiment, the (predominantly) magnetic field of the transmitter is modulated or impressed with information so as to transfer information, along with power.

In another embodiment this information comprises control signaling between the receiver and transmitter, thereby obviating any separate data or communications link (and hence simplifying the system and making it more robust). For instance, the transmitter may modulate the transmitted narrowband signal as a function of time, e.g., via an amplitude modulation, phase modulation, sideband or frequency modulation; e.g., GMSK or sideband shift up or down to encode a data "0" or "1", pseudo-noise modulation, or other technique. This allows transfer of information relating to inter alia transmitter parameters (such as resonant frequency, polarization, etc. that might otherwise allow the receiver to better "lock on" to the transmitter to optimize power transfer. Duty cycle, clock, or timing information might also be encoded: e.g., windows during which the transmitter will be operational, to synchronize time frames of reference etc.

The theoretical limits on antenna performance are explained herein. Aspects such as the antenna efficiency, quality factor (bandwidth) and size are considered. In addition, a model for the radio wave propagation in the near-field and in the far-field is established.

An electrically small antenna is an antenna that can be fitted into a fraction of a radiansphere, which is a sphere of radius $r_{max}$ $$r_{max} = \frac{1}{k} = \frac{\lambda}{2\pi} = \frac{c}{2\pi f} = \frac{d_{max}}{2} \quad \text{(eq A-1)}$$

where: k is the wavenumber in m$^{-1}$
Δ is the wavelength in m
c is the speed of light 299792458 ms-1
f is the frequency in Hz, and
$d_{max}$ is the diameter of the radiansphere The antennas used for this application will be electrically small in almost all cases (i.e. k*r<1), where k*r=d*π/λ with r and d the radius and diameter, respectively, of a sphere encompassing the antenna structure.

Electrically small antennas are not typically self-resonant. For low frequencies, the antennas are either capacitive (dipole antenna) or inductive (loop antenna). They can be approximated for example by a first-order series RC or parallel RL circuit. They are brought to resonance by tuning with a reactor of an opposite kind.

Figure 8:
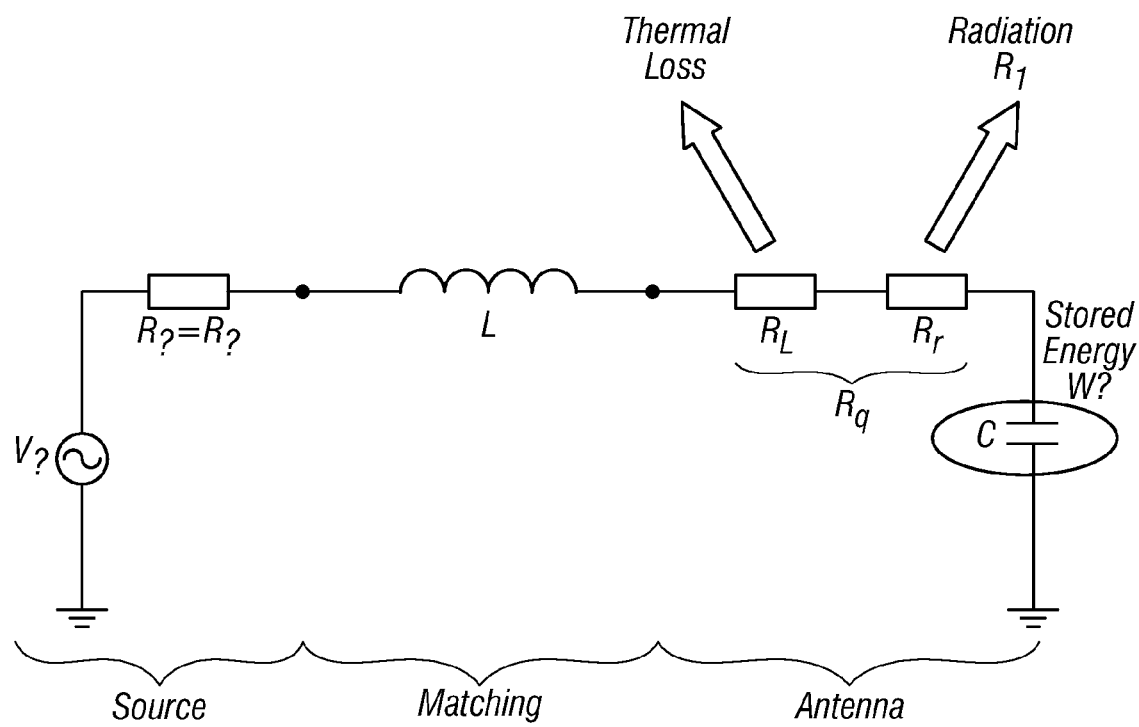
FIG. 8 illustrates a circuit diagram of an electrically small antenna, operating in a capacitive mode, in accordance with the second set of exemplary embodiments of the present invention.

The equivalent circuit of such an antenna is shown in FIG. 8 for the capacitive case. One main element of the antenna is the radiation resistance $R_r$. In the equivalent circuit, this resistor models the radiated power $P_r$. The loss resistor $R_L$ accounts for the conduction and dielectric losses of the antenna. The capacitor C represents the reactive component of the antenna. This, together with the external matching inductor L forms a resonant circuit, which is tuned to the operating frequency. This circuit can also be modeled as an equivalent representation as a parallel resonant circuit.

$$R_o + j\omega_o L = \left(\frac{R_L + R_r}{R_a}\right) - j\frac{1}{\omega_o C}, \omega_o = \frac{1}{\sqrt{LC}} \quad \text{(eq A-2)}$$

where:

$R_o$ is the source resistence in Ω

$R_a$ is the antenna resistence in Ω

$R_L$ is the loss resistence in Ω

$R_r$ is the radiation resistence in Ω

$\omega_o$ is the resonance frequency in rads$^{-1}$

L is the matching inductance in H

C is the antenna capacitance in F

For maximum power transfer, the antenna and matching network impedance is complex conjugate matched at resonance to the antenna impedance.

A similar circuit can be derived for the case of an inductive antenna.

Applicants believe that there are fundamental limits on the efficiency and quality Factor of such an antenna. If a certain antenna performance is required, the size of an antenna cannot be reduced to an arbitrary value. Like the well-known Shannon limit in communication theory, which relates channel capacity to bandwidth and dynamic range, there is also a fundamental limit in antenna theory that relates minimum antenna size to the radiation quality factor.

There have been many attempts to calculate the theoretical limits on antenna size. The fundamental work was done by Chu [CHU] and Harrington [HAR]. Their theory states that the antenna is completely enclosed by a sphere of radius r, The field outside the sphere, can be expressed as a sum of weighted spherical waves propagating radially outward. Each wave (mode) exhibits power orthogonality and therefore carries power independently from the others.

It can be mathematically proven that a particular field outside the sphere can be generated with an infinite number of different source distributions. The field outside the sphere is therefore independent from a particular implementation of the antenna. From Chu's calculation it has been shown that an antenna that excites only one mode (either TE01 or TM01) achieves the lowest possible radiation quality factor of any linearly polarized antenna. Based on the above-described fundamental work. Hansen derived an approximate analytical expression for this quality factor $Q_r$ [HAN], which has been cited many times in the literature. Mclean further developed and corrected the work from Hansen [MLE], giving an exact expression for the radiation quality factor $Q_r$ of a linear polarized antenna:

$$Q = \begin{cases} 2\omega\frac{W_e}{P_r}, W_e > W_m \text{(capactive antenna)} \\ 2\omega\frac{W_e}{P_r}, W_m > W_e \text{(inductive antenna)} \end{cases} \quad \text{Equation 3}$$

$$= \frac{1}{(kr)^3} + \frac{1}{kr}$$

where:
$Q_r$ is the radiation quality factor (unitless)
ω is the radian frequency in rads$^{-1}$
$W_e$ is the time-averaged, non-propagating, stored electric energy in J
$W_m$ is the time-averaged, non-propagating, stored magnetic energy in J
$P_r$ is the radiated power in W This equation shows that the dominant term for electrically small antennas (k*r<<1) is the cubie term. However, for large antennas (k*r>>1) the radiation quality factor will be governed by the linear term.

A physical implementation of an antenna exhibits losses, i.e. its radiation efficiency is smaller than unity due to non-ideal conductors and dielectrics. The reduction of the efficiency has an impact on the overall quality factor, called the antenna quality factor. Assuming the antenna is power-matched to the source, the antenna quality factor $Q_a$ results in:

$$Q_n = \eta_r Q_r$$

where:
$Q_n$ is the antenna quality factor (unitless)
Eq A4
where:
Qr is the radiation quality factor (unitless)

Three important relations can be derived from Equation A3 and Equation A4: For small antennas the efficiency is proportional to the cube of the relative antenna size and therefore also proportional to the cube of the antenna size and to the cube of the frequency:

$$\eta r \propto (kr)^2 \propto r^3 \propto f^3 \quad \text{Equation 5}$$

For large antennas the efficiency is proportional to the relative antenna size and therefore also proportional to the antenna size and the frequency:

$$\eta_r \propto kr \propto r \propto f \quad \text{Equation 6}$$

In general, the radiation efficiency is proportional to the antenna quality factor:

$$\eta_r \propto Q_a \quad \text{Equation 7}$$

For the antenna models in FIG. 4 and FIG. 5 the values for radiation quality factor $Q_r$ and radiation efficiency $\eta_r$ are given as:

$$Q_{r,cap} = \frac{\text{Im}\{Z_a\}}{\text{Re}\{Z_a\}} = \frac{1}{\omega_o R_r C} \qquad \text{Equation 8}$$

$$Q_{r,ind} = \frac{\text{Im}\{Y_a\}}{\text{Re}\{Y_a\}} = \frac{R_r}{\omega_o L} \qquad \text{Equation 9}$$

$$\eta_r = \frac{P_r}{P_{in}} = \frac{R_r}{R_r + R_L} \qquad \text{Equation 10}$$

where:
$\eta_r$ is the radiation efficiency (unitless)
$Z_n$ is the antenna input impedance in $\Omega$
$Y_a$ is the antenna input admittance $\Omega^{-1}$
$P_r$ is the radiated power at resonance in W
$P_{in}$ is the power input to the antenna at resonance in W This shows that for a given radiation efficiency, reducing antenna size leads to increased antenna quality factor. For a given antenna size, decreasing radiation efficiency results in lower antenna quality factor. Consequently, for a given radiation efficiency, a higher antenna quality factor is the penalty for a small antenna size.

The antenna quality factor decreases with increasing frequency and increasing antenna size when the radiation efficiency is kept constant. For the wireless powering and charging system the antenna efficiency is the most important criterion, as this determines how much power can be transmitted between two antennas. Equation 5 illustrates that the antenna efficiency is proportional to the cube of the relative antenna size and therefore also proportional to the cube of the absolute antenna size. Increasing the size by a factor of 10 results in an improvement of antenna efficiency of 30 dB (factor 1000), assuming that the antenna quality factor is kept constant.

Equation 7 shows that the antenna quality factor is proportional to the antenna efficiency. Increasing by 10 times the antenna quality factor yields an increase of the antenna efficiency of 10 dB (factor 10), assuming a constant relative antenna size. Antenna efficiency is proportional to the cube of the frequency. An increase by a factor of 10 in the frequency leads to an improvement of the antenna efficiency by 30 dB (factor 1000), assuming that the antenna size and the antenna quality factor are kept constant.

Unlike the fundamental limits on efficiency and quality factor that have been described above, the gain does not present a physical limit. However, as opposed to the gain, there is a good knowledge of the directivity that can be achieved with certain antenna types. The directivity is linked to the gain as follows:

$$G = \eta * D \qquad (A11)$$

Where $\eta$ is the antenna radiation efficiency

According to Balanis [BAL], the directivity of a small dipole is D=1.5. The same directivity applies also to a small loop. This similarity becomes clear when the principle of duality of the electric and magnetic field is applied, as a small loop can be described with the help of a magnetic dipole.

Higher directivities can be expected from antennas that are not electrically small. This is the case e.g. for the dipole as can be seen from Figure A1. If the maximum antenna dimension is in the order of a wavelength, the directivity is higher than that of the small dipole. However, for the wireless powering and charging system this is only the case for frequencies above 1 GHz.

Radio Wave Propagation

The characteristics of an antenna show a strong dependence on the point (in terms of distance) where their fields are observed. A distinction between near field and far field is often made. In the near-field region, the electromagnetic energy is mainly stored and not radiated (stationary wave). The boundary for this region is usually defined as:

Near-field: In the near-field region the electromagnetic energy is mainly stored and not radiated (stationary wave). The boundary for this region is usually defined as:

$$kr \ll 1 \leftrightarrow r \ll \frac{\lambda}{2\pi},$$

where:
k is the wave number, and
r is the observation distance to the antenna

In the far-field region most of the electromagnetic energy is radiated and not stored. The boundary for this area is usually defined as:

Far-field: In the far-field region most of the electromagnetic energy is radiated and not stored. The boundary for this area is usually defined as:

$$kr \gg 1 \leftrightarrow r \gg \frac{\lambda}{2\pi}$$

Between the near-field and the far-field a transition from a stationary into a propagating wave occurs. This is the so-called transition region.

For a distance of 0.5 to 5 m to the antenna the boundary between the near-field and the far-field is in the frequency range of 10 to 100 MHz.

All radio waves propagate in a very different manner in the near-field and in the far-field. From radio communication theory the Friis transmission equation is well known. It describes the ratio of received power to power of a transmit antenna, assuming a certain receive and transmit antenna gain, as well as a certain separation between these antennas:

$$\frac{P_{Rx}}{P_{Tx}} = G_{Tx} G_{Rx} \left(\frac{\lambda}{4\pi r}\right)^2 \qquad \text{Equation 12}$$

This equation is only valid in the Far-field. For a more general treatment of energy transmission between two antennas, a new equation is developed that also covers the near-field.

The radiated fields of an electrically small dipole will be considered as a basis for this general radio wave propagation model. The dipole can also be used to model a loop antenna because of the principle of duality of the electric and magnetic field. Because of this, the electric field component of a dipole corresponds to the magnetic field component of the loop and vice versa.

Equation 13 and Equation 14 show the components of the electric and the magnetic field of a small dipole. The radial component of the electric field has been omitted, as it accounts only for the reactive energy that is stored in the near-field.

$$E_\theta = j\eta \frac{kI_o l \sin\theta}{4\pi r}\left[1 + \frac{1}{jkr} - \frac{1}{(kr)^2}\right] \cdot e^{-jkr} \quad \text{Equation 13}$$

$$H_\phi = j\frac{kI_o l \sin\theta}{4\pi r}\left[1 + \frac{1}{jkr}\right] \cdot e^{-jkr} \quad \text{Equation 14}$$

In these equations, r is the distance to the antenna and not the antenna radius. After some algebraic manipulations, the following simplified equations for the field magnitude can be obtained:

$$|E_\theta|^2 \propto \frac{1}{(kr)^2} - \frac{1}{(kr)^4} + \frac{1}{(kr)^6} \propto P_{RX,E} \quad \text{Equation 15}$$

$$|H_\phi|^2 \propto \frac{1}{(kr)^2} + \frac{1}{(kr)^4} \propto P_{RX,H} \quad \text{Equation 16}$$

The received power from a co-polarized antenna, that is, one in which the transmit and the receive antenna are parallel to each other, is proportional to the time averaged value of the incident field squared as described above. Thus, the path gain can be calculated as follows $$G_{path,E_\phi} = \frac{P_{RX,E}}{P_{TX}} = \frac{G_{Tx}G_{Rx}}{4}\left[\frac{1}{(kr)^2} - \frac{1}{(kr)^4} + \frac{1}{(kr)^6}\right] \quad \text{Equation 17}$$

$$G_{path,H_\phi} = \frac{P_{RX,H}}{P_{TX}} = \frac{G_{Tx}G_{Rx}}{4}\left[\frac{1}{(kr)^2} + \frac{1}{(kr)^4}\right] \quad \text{Equation 18}$$

Equation 17 is the propagation law for like antennas (propagation from a dipole to another co-polarized dipole or propagation from a loop to another co-polarized loop). Equation 18 is the propagation law for unlike antennas (propagation from a dipole to a co-polarized loop or propagation from a loop to a co-polarized dipole). The path gain in the near-field is much higher than what would be expected by applying the far-field theory (Friis equation). For the transmission between like antennas in the near-field a path loss of 60 dB/decade can be seen, whereas the transmission between unlike antennas in the near-field has a path loss of 40 dB/decade. This is contrasted to the path loss of 20 dB/decade that is seen in the far-field.

These equations can be used to determine additional antennas and characteristics that can be used for this purpose.

Although only a few embodiments have been disclosed in detail above, other embodiments are possible and the inventors intend these to be encompassed within this specification. The specification describes specific examples to accomplish a more general goal that may be accomplished in another way. This disclosure is intended to be exemplary, and the claims are intended to cover any modification or alternative which might be predictable to a person having ordinary skill in the art.

For example, other antenna forms and selections can be used. The term "power" as used herein can refer to any kind of energy, power or force transfer of any type. The receiving source can be any device that operates from stored energy, including a computer or peripheral, communicator, automobile, or any other device. Myriad applications of the foregoing transmitter, receiver and transceiver apparatus of the invention are recognized. By way of example and without limitation, such applications include: (i) powering or charging portable computers. PMDs. client devices. cellular phones. etc.; (ii) powering or charging flat screen or wall-mounted televisions or displays; (iii) powering or charging refrigerators (e.g., by placing a transmitter on the wall behind the refrigerator. and a receiver in the refrigerator proximate to the transmitter); (iv) powering or charging electric cars; e.g., by placing or building in a transmitter in the floor of a garage, and placing a receiver on the bottom of the car: (v) powering or charging home or office lighting: e.g., incandescent, fluorescent or LED, based lamps with no cords: (vi) powering or charging home or office appliances such as toasters, blenders, clocks, televisions, microwave ovens, printers, computers, etc.: (vii) powering or charging multiple devices simultaneously (e.g., through the use of a substantially omni-directional transmitter arrangement); and (viii) powering or charging devices where the presence of electrical conductors with voltage would represent a hazard; e.g., near water, near children, etc.

As used herein, the terms "electrical component" and "electronic component" are used interchangeably and refer to, without limitation, components adapted to provide some electrical or electronic function, including without limitation inductive reactors ("choke coils"), transformers, filters, gapped core toroids, inductors, capacitors, resistors, operational amplifiers, varactors, MEMS devices, FETs and other transistors and diodes, whether discrete components or integrated circuits, whether alone or in combination.

As used herein, the term "integrated circuit (IC)" refers to any type of device having any level of integration (including without limitation ULSI, VLSI, and LSI) and irrespective of process or base materials (including, without limitation Si, SiGe, CMOS and GAs). ICs may include, for example, memory devices (e.g., DRAM, SRAM, DDRAM, EEPROM/Flash, ROM), digital processors, SoC devices, FPGAs, ASICs, ADCs, DACs and other devices, as well as any combinations thereof.

As used herein, the term "digital processor" is meant generally to include all types of digital processing devices including, without limitation, digital signal processors (DSPs), reduced instruction set computers (RISC), general-purpose (CISC) processors, microprocessors, gate arrays (e.g., FPGAs), Reconfigurable Compute Fabrics (RCFs), and application-specific integrated circuits (ASICs). Such digital processors may be contained on a single unitary IC die, or distributed across multiple components.

As used herein, the terms "computing device", "client device", and "end user device" include, but are not limited to, personal computers (PCs) and minicomputers, whether desktop, laptop, or otherwise, set-top boxes such as the Motorola DCT2XXX15XXX and Scientific Atlanta Explorer 2XXX13XXX/4XXX18XXX series digital devices, personal digital assistants (PDAs) such as the Blackberry® or "Palm®" family of devices, handheld computers, personal communicators, J2ME equipped devices, cellular telephones, or literally any other device capable of using power, or interchanging data with a network.

As used herein, the term "memory" includes any type of integrated circuit or other storage device adapted for storing digital data including, without limitation, ROM, PROM, EEPROM, DRAM, SDRAM, DDR/2 SDRAM, EDOIFPMS, RLDRAM, SRAM, "flash" memory (e.g., NANDINOR), and PSRAM.

Also, the inventors intend that only those claims which use the words "means for" are intended to be interpreted under 35 use 112, sixth paragraph. Moreover, no limitations from the specification are intended to be read into any claims, unless those limitations are expressly included in the claims.

The operations and/or flowcharts described herein may be carried out on a computer, or manually. If carried out on a computer, the computer may be any kind of computer, either general purpose, or some specific purpose computer such as a workstation. The computer may be an Intel (e.g., Pentium or Core 2 duo) or AMD based computer, running Windows XP or Linux, or may be a Macintosh computer. The computer may also be a handheld computer, such as a PDA, cellphone, or laptop. Moreover, the method steps and operations described herein can be carried out on a dedicated machine that does these functions.

The programs may be written in C or Python, or Java, Brew or any other programming language. The programs may be resident on a storage medium, e.g., magnetic or optical, e.g. the computer hard drive, a removable disk or media such as a memory stick or SD media, wired or wireless network based or Bluetooth based Network Attached Storage (NAS), or other removable medium or other removable medium. The programs may also be run over a network, for example, with a server or other machine sending signals to the local machine, which allows the local machine to carry out the operations described herein.

Where a specific numerical value is mentioned herein, it should be considered that the value may be increased or decreased by 20%, while still staying within the teachings of the present application, unless some different range is specifically mentioned. Where a specified logical sense is used, the opposite logical sense is also intended to be encompassed.

What is claimed is:

1. A method of transferring power, comprising:
   transmitting power from a transmitter to a receiver, wherein the transmitter comprises
   a coupling loop driven by a source, and
   a resonating circuit magnetically coupled to the coupling loop, and spaced apart from the coupling loop, the resonating circuit comprising
   an inductive loop antenna, and
   a capacitor electrically coupled to the inductive loop antenna, the inductive loop antenna spaced apart from the coupling loop, the coupling loop configured to inductively excite the resonating circuit, and the coupling loop further configured to provide matching between the source and the resonating circuit based at least in part on the spacing between the coupling loop and the resonating circuit, the resonating circuit configured to generate a magnetic field based on being excited by the coupling loop to transmit power sufficient to charge or power a load of the receiver;
   receiving signaling information from the receiver, the signaling information indicating a level of received power as determined by the receiver;
   comparing the level of the received power to a level of the transmitted power; and
   tuning the resonant frequency of the transmitter based at least in part on the comparison of the level of the received power to the level of the transmitted power.

2. The method as in claim 1, wherein said tuning comprises matching impedances between the transmitter and the receiver.

3. The method as in claim 2, wherein the capacitor comprises an adjustable capacitor, and wherein said tuning comprises electrically adjusting a capacitance value of the adjustable capacitor in the transmitter.

4. The method as in claim 3, wherein said tuning comprises adjusting a distance between plates in the adjustable capacitor.

5. The method as in claim 3, wherein said adjustable capacitor comprises an electrically adjustable capacitor, and said tuning comprises automatically tuning.

6. The method as in claim 5, wherein said electrically adjustable capacitor comprises a varactor diode.

7. The method as in claim 3, further comprising a fixed value capacitor in addition to said adjustable capacitor.

8. The method as in claim 7, further comprising a variable capacitor that has 8-12% of a capacitance value of the fixed value capacitor.

9. The method as in claim 1, further comprising detecting an object in response to detecting a reduction in matching between the transmitter and the receiver.

10. The method as in claim 1, wherein the capacitor comprises an electrically-adjustable capacitor, and wherein said tuning comprises electrically adjusting a capacitance value of the electrically-adjustable capacitor in the transmitter to a desired value.

11. The method as in claim 1, wherein said transmitting comprises storing energy in a near field of the transmitter and inducing said energy into the receiver.

12. The method as in claim 1, wherein inductive loop antenna has a Q of at least 1000.

13. The method as in claim 1, wherein the inductive loop antenna is a magnetic antenna which is tuned to within 10% of its resonant value.

14. The method as in claim 2, wherein the transmitter includes at least one additional capacitor therein, and further comprising sizing the capacitor and the additional capacitor to withstand at least 2 KV of reactive voltage.

15. A wireless power transmitter, comprising:
    a coupling loop driven by a source;
    a resonating circuit magnetically coupled to the coupling loop, and spaced apart from the coupling loop, the resonating circuit comprising an inductive loop antenna and a capacitor electrically coupled to the inductive loop antenna, the inductive loop antenna spaced apart from the coupling loop, the coupling loop configured to inductively excite the resonating circuit, and the coupling loop further configured to provide matching between the source and the resonating circuit based at least in part on the spacing between the coupling loop and the resonating circuit, the resonating circuit configured to generate a magnetic field based on being excited by the coupling loop to transmit power sufficient to charge or power a load of a receiver;
    a receiving signaling information circuit configured to receive signaling information from the receiver, the signaling information indicating a level of received power as determined by the receiver, and the receiving signaling information circuit further configured to compare the level of the received power to a level of the transmitted power; and
    a tuning circuit configured to tune the resonant frequency of the inductive loop antenna based at least in part on the comparison of the level of the received power to the level of the transmitted power.

16. The transmitter as in claim 15, wherein said tuning circuit comprises an adjustable capacitor.

17. The transmitter as in claim 16, wherein said adjustable capacitor comprises a capacitor with plates whose relative distance can be adjusted.

18. The transmitter as in claim 15, wherein said tuning circuit comprises an electrically adjustable capacitor.

19. The transmitter as in claim 18, wherein said tuning circuit comprises a varactor diode.

20. The transmitter as in claim 18, further comprising a fixed value capacitor in addition to said adjustable capacitor.

21. The transmitter as in claim 20, wherein the adjustable capacitor is a variable capacitor that has 8-12% of a capacitance value of the fixed value capacitor.

22. The transmitter as in claim 15, further comprising a detection circuit configured to detect, during operation, interference caused by an object reducing the matching between the inductive loop antenna and a receiving antenna, the detection circuit further configured to terminate power transmission until the reduction of matching is terminated.

23. The transmitter as in claim 15, wherein the capacitor comprises an electrically-adjustable capacitor connected to the inductive loop antenna and wherein said tuning circuit electrically adjusts a capacitance value of the electrically-adjustable capacitor to improve said matching.

24. The transmitter as in claim 15, wherein said inductive loop antenna has a Q of at least 1000.

25. The transmitter as in claim 15, wherein said inductive loop antenna is a magnetic antenna which is tuned to within 10% of its resonant value.

26. The transmitter as in claim 15, wherein at least part of said inductive loop antenna is electrically decoupled from said power transmitter.

27. A system for transferring power, the system comprising:
means for transmitting power to a receiver, wherein the transmitting means comprises a coupling loop driven by a source; and
a resonating circuit magnetically coupled to the coupling loop and spaced apart from the coupling loop, the resonating circuit comprising
an inductive loop antenna; and
a capacitor electrically coupled to the inductive loop antenna, the inductive loop antenna spaced apart from the coupling loop, the coupling loop configured to inductively excite the resonating circuit and the coupling loop further configured to provide matching between the source and the resonating circuit based at least in part on the spacing between the coupling loop and the resonating circuit, the resonating circuit configured to generate a magnetic field based on being excited by the coupling loop to transmit power sufficient to charge or power a load of the receiver;
means for receiving signaling information from the receiver, the signaling information indicating a level of received power as determined by the receiver;
means for comparing the level of the received power to a level of the transmitted power; and
means for tuning the resonant frequency of the transmitting means based at least in part on the comparison of the level of the received power to the level of the transmitted power.

28. A system for transferring power, the system comprising:
a power transmitter configured to transmit power to a receiving antenna of a receiver, wherein the power transmitter comprises a coupling loop driven by a source, and a resonating circuit magnetically coupled to the coupling loop, and spaced apart from the coupling loop, the resonating circuit and comprising an inductive loop antenna and a capacitor electrically coupled to the inductive loop antenna, the inductive loop antenna spaced apart from the coupling loop, the coupling loop configured to inductively excite the resonating circuit and the coupling loop further configured to provide matching between the source and the resonating circuit based at least in part on the spacing between the coupling loop and the resonating circuit, the resonating circuit configured to generate a magnetic field based on being excited by the coupling loop to transmit power sufficient to charge or power a load of the receiver;
a signaling information receiver configured to receive signaling information from the receiver, the signaling information indicating a level of received power as determined by the receiver, and the signaling information receiver further configured to compare the level of the received power to a level of the transmitted power; and
a controller configured to tune the resonant frequency of the power transmitter based at least in part on the comparison of the level of the received power to the level of the transmitted power.

29. A wireless power transmitter, comprising:
means for transmitting power to a receiver, wherein the transmitting means comprises a coupling loop driven by a source; and
a resonating circuit magnetically coupled to the coupling loop, and spaced apart from the coupling loop, the resonating circuit comprising
an inductive loop antenna and a capacitor electrically coupled to the inductive loop antenna, the inductive loop antenna spaced apart from the coupling loop, the coupling loop configured to inductively excite the resonating circuit and the coupling loop further configured to provide matching between the source and the resonating circuit based at least in part on the spacing between the coupling loop and the resonating circuit, the resonating circuit configured to generate a magnetic field based on being excited by the coupling loop to transmit power sufficient to charge or power a load of the receiver;
a receiving signaling information circuit configured to receive signaling information from the receiver, the signaling information indicating a level of received power as determined by the receiver, and the receiving signaling information circuit further configured to compare the level of the received power to a level of the transmitted power; and
a tuning circuit configured to tune the resonant frequency of the inductive loop antenna based at least in part on the comparison of the level of the received power to the level of the transmitted power.

30. The method as in claim 1, wherein the magnetic field modulates the signaling information, and wherein receiving signaling information comprises demodulating the modulated magnetic field.

31. The transmitter as in claim 15, wherein the magnetic field modulates the signaling information, and wherein the receiving signaling information circuit is further configured to demodulate the modulated magnetic field.

32. A wireless power transmitter, comprising:
a coupling loop driven by a source;
a resonating circuit magnetically coupled to the coupling loop, and spaced apart from the coupling loop, the resonating circuit comprising
an inductive loop antenna; and
a capacitor electrically coupled to the inductive loop antenna, the coupling loop configured to inductively excite the resonating circuit and the coupling loop further configured to provide matching between the source and the resonating circuit based at least in part on the spacing between the coupling loop and the resonating circuit, the resonating circuit configured to generate a magnetic field based on being excited by the coupling loop to transmit power sufficient to charge or power a load of a receiver.

33. The transmitter as in claim 32, wherein the capacitor is a fixed capacitor, and wherein the resonating circuit further comprises a tunable capacitor.

34. The transmitter as in claim 33, wherein the tunable capacitor has a tuning range of about ±10 percent of a fixed capacitance value of the fixed capacitor.

35. The transmitter as in claim 33, wherein the fixed capacitor is larger in size than the tunable capacitor.

36. The transmitter as in claim 32, further comprising a second capacitor electrically coupled to the coupling loop, wherein the coupling loop further comprises a tunable capacitor.

37. The transmitter as in claim 36, wherein a quality factor is selected to be inversely proportional to a loss resistance and a radiation resistance.

38. The transmitter as in claim 32, wherein the inductive loop antenna comprises a wire having a plurality of turns, and wherein the quality factor is selected to be proportional to the number of the turns and a surface area of the wire, and inversely proportional to a dielectric loss of the wire.

39. The transmitter as in claim 32, wherein a quality factor of the resonating circuit comprises loaded and unloaded quality factors, and wherein the loaded quality factor has a value half that of the unloaded quality factor.

40. The transmitter as in claim 33, wherein the tunable capacitor of the resonating circuit has a value greater than a self-capacitance of the resonating circuit.

41. The transmitter as in claim 36, wherein each of the tunable capacitors has a tuning range of about ±5 percent of the resonant frequency.

42. The transmitter as in claim 32, wherein the coupling between the coupling loop and the resonating circuit is greater than the coupling between the resonating circuit and a receive antenna of the receiver.

43. The transmitter as in claim 32, wherein the coupling between the coupling loop and resonating circuit substantially behaves as an ideal transformer as compared to coupling between the resonating circuit and a receive antenna of the receiver that behaves as a loosely coupled transformer.

44. The transmitter as in claim 32, wherein the coupling loop has less turns than the inductive loop of the resonating circuit.

45. The transmitter as in claim 32, wherein the coupling loop is at a fixed distance from the resonating circuit and is closer to the resonating circuit as compared to distances between the resonating circuit and a receive antenna of the receiver.

46. The transmitter as in claim 32, wherein the resonating circuit is not electrically connected to a load that uses power received from the coupling loop.

47. The transmitter as in claim 32, further comprising a tuning circuit configured to tune the resonant frequency of the inductive loop antenna, the tuning circuit comprising a fixed capacitor in parallel with a varactor diode.

48. The transmitter as in claim 32, further comprising a tuning circuit configured to tune the resonant frequency of the inductive loop antenna, the tuning circuit comprising comprises an electrically adjustable variable capacitor and a fixed value capacitor.

49. The transmitter as in claim 48, wherein the variable capacitor has 8-12% of a capacitance value of the fixed value capacitor.

* * * * *

UNITED STATES PATENT AND TRADEMARK OFFICE
CERTIFICATE OF CORRECTION

PATENT NO. : 9,774,086 B2
APPLICATION NO. : 12/018069
DATED : September 26, 2017
INVENTOR(S) : Nigel P. Cook et al.

It is certified that error appears in the above-identified patent and that said Letters Patent is hereby corrected as shown below:

On the Title Page

In Column 1 (page 5, item (56)) at Line 47, Under Other Publications, change "no-rediative" to --non-radiative--.

In the Specification

In Column 3 at Line 62, Change "for or" to --for exposure or--.

In Column 3 at Line 62, Change "can not" to --cannot--.

In Column 3 at Line 66, Change "[ICN]," to --[ICN].--.

In Column 5 at Line 2, Change "that that" to --that--.

In Column 5 at Line 24, Change "500 urn," to --500 um,--.

In Column 8 at Line 66, Change "(Cs)" to --($C_s$)--.

In Column 12 at Line 27 (approx.), Change "$\Delta_0$" to --$\omega_0$--.

In Column 17 at Line 18, Change "psuedorandomly" to --pseudorandomly--.

In Column 19 at Line 7 (approx.), Change "$\Delta$" to --$\lambda$--.

In Column 19 at Line 37 (approx.), Change "resistence" to --resistance--.

In Column 19 at Line 39 (approx.), Change "resistence" to --resistance--.

In Column 19 at Line 40 (approx.), Change "resistence" to --resistance--.

Signed and Sealed this
Sixth Day of March, 2018

Andrei Iancu
*Director of the United States Patent and Trademark Office*

CERTIFICATE OF CORRECTION (continued)
U.S. Pat. No. 9,774,086 B2

In Column 19 at Line 42 (approx.), Change "resistence" to --resistance--.

In Column 19 at Line 66, Change "r," to --r.--.

In Column 20 at Lines 19-24 (approx.), Change

"$$Q = \begin{cases} 2\omega \frac{W_e}{P_r}, W_e > W_m \text{(capactive antenna)} \\ 2\omega \frac{W_e}{P_r}, W_m > W_e \text{(inductive antenna)} \end{cases}$$
$$= \frac{1}{(kr)^3} + \frac{1}{kr}\text{,''}$$

to --
$$Q = \begin{cases} 2\omega \frac{W_e}{P_r}, W_e > W_m \text{(capacitive antenna)} \\ 2\omega \frac{W_e}{P_r}, W_m > W_e \text{(inductive antenna)} \end{cases} = \frac{1}{(kr)^3} + \frac{1}{kr}$$
--.

In Column 20 at Line 58 (approx.), Change "ηr" to --η$_r$--.

In Column 21 at Lines 6-8 (approx.), Change " $Q_{r,cap} = \frac{\text{Im}\{Z_a\}}{\text{Re}\{Z_a\}} = \frac{1}{\omega_o R_r C}$ ,"

to -- $Q_{r,cap} = \frac{\text{Im}\{Z_a\}}{\text{Re}\{Z_a\}} = \frac{1}{\omega_o R_r C}$ --.

In Column 21 at Lines 9-10 (approx.), Change " $Q_{r,ind} = \frac{\text{Im}\{Y_a\}}{\text{Re}\{Y_a\}} = \frac{R_r}{\omega_o L}$ ,"

to -- $Q_{r,ind} = \frac{\text{Im}\{Y_a\}}{\text{Re}\{Y_a\}} = \frac{R_r}{\omega_o L}$ --.

In Column 24 at Lines 1-2, Change "computers. PMDs. client devices. cellular phones." to --computers, PMDs, client devices, cellular phones,--.

In Column 24 at Line 5, Change "refrigerator. and" to --refrigerator, and--.

In the Claims

In Column 27 at Line 63, In Claim 28, change "circuit and" to --circuit--.